US008913693B2

(12) United States Patent
Smith et al.

(10) Patent No.: US 8,913,693 B2
(45) Date of Patent: Dec. 16, 2014

(54) QUADRATURE MODULATOR BALANCING SYSTEM

(71) Applicant: Raytheon Company, Waltham, MA (US)

(72) Inventors: Robert J. Smith, Fort Wayne, IN (US); Abdullah Eroglu, Fort Wayne, IN (US)

(73) Assignees: Raytheon Company, Waltham, MA (US); Purdue Research Foundation, West Lafayette, IN (US)

( * ) Notice: Subject to any disclaimer, the term of this patent is extended or adjusted under 35 U.S.C. 154(b) by 141 days.

(21) Appl. No.: 13/667,720

(22) Filed: Nov. 2, 2012

(65) Prior Publication Data

US 2013/0121443 A1 May 16, 2013

Related U.S. Application Data

(60) Provisional application No. 61/554,807, filed on Nov. 2, 2011.

(51) Int. Cl.
*H03C 3/00* (2006.01)
*H04L 27/36* (2006.01)

(52) U.S. Cl.
CPC ............ *H04L 27/361* (2013.01); *H04L 27/364* (2013.01)
USPC .......................................... 375/302; 375/296

(58) Field of Classification Search
CPC .............. H04B 17/0015; H04L 27/364; H04L 2027/0016
USPC ................................... 375/296, 298, 302, 308
See application file for complete search history.

(56) References Cited

U.S. PATENT DOCUMENTS

| 7,388,926 | B2 | 6/2008 | Ishikawa et al. |
| 7,515,650 | B1 | 4/2009 | Warner et al. |
| 2003/0231075 | A1 | 12/2003 | Heiskala et al. |
| 2004/0056728 | A1* | 3/2004 | Dent et al. ..................... 331/158 |
| 2004/0162038 | A1* | 8/2004 | Kanazawa et al. ............ 455/126 |
| 2008/0181344 | A1 | 7/2008 | Jiang et al. |
| 2011/0115571 | A1 | 5/2011 | Nakamura et al. |
| 2012/0300818 | A1* | 11/2012 | Metreaud et al. ............. 375/219 |
| 2013/0058388 | A1* | 3/2013 | Muhammad ................... 375/222 |

OTHER PUBLICATIONS

International Search Report dated Nov. 2, 2012 for corresponding Application No. PCT/US12/63225.
Written Opinion of the International Searching Authority for PCT Application No. PCT/US12/63225, dated Feb. 15, 2013, pp. 1-4.

* cited by examiner

*Primary Examiner* — David B. Lugo
(74) *Attorney, Agent, or Firm* — Cantor Colburn LLP

(57) ABSTRACT

A method of balancing a quadrature modulator includes exciting an in-phase input of the quadrature module and sweeping a phase of an injection signal through a range of degrees, and determining a plurality of in-phase DC components. The method further includes exciting a quadrature input of the quadrature module and sweeping a phase of the injection signal through the range of degrees, and determining a plurality of quadrature DC components. An in-phase sinusoidal equivalent of the plurality of in-phase DC components and a quadrature sinusoidal equivalent of the plurality of quadrature DC components may be determined. At least one correction factor that balances the quadrature modulator may be determined based on a comparison between the in-phase sinusoidal equivalent and the quadrature sinusoidal equivalent.

18 Claims, 29 Drawing Sheets

HARMONIC BALANCE SIMULATION: THIS SIMULATION SWEEPS THE PHASE OF EACH TEST SIGNAL FROM 0 TO 360 DEGREES IN 0.1 DEGREE INCREMENTS

| HARMONIC BALANCE | PARAMETER SWEEP | SWEEP PLAN |

HARMONICBALANCE
HB1
FREQ[1]=FBB MHZ
FREQ[2]=FBB MHZ
ORDER[1]=3
ORDER[2]=3

PARAMSWEEP
SWEEP1
SWEEPVAR="PHI"
SIM INSTANCENAME[1]="HB1"
SIM INSTANCENAME[2]=
SIM INSTANCENAME[3]=
SIM INSTANCENAME[4]=
SIM INSTANCENAME[5]=
SIM INSTANCENAME[6]=
START=PHI_START
STOP=PHI_STOP
STEP=PHI_STEP

SWEEPPLAN
SWPPLAN1
START=PHI_START STOP=PHI_STOP STEP=PHI_STEP LIN=
USESWEEPPLAN=
SWEEP PLAN=
REVERSE=NO

| VAR EQN | VAR VAR1 |
FBB=10
PHI=10
A=1
PHI_REF=0
FLO=500
IMBALANCES ADDED INTO BOTH QUAD MOD CIRCUITS

| VAR VAR5 |
PHI_STEP=0.1
PHI_START=1
PHI_STOP=360

| VAR EQN | VAR VAR2 |
PHI_EN=0.5
PHI_EN1=0.2
PHI_EN2=10
A=1.1

DC OFFSETS ADDED INTO THE OUTPUT MIXER. SIMULATES A REAL MIXER WITH UNKNOWN DC OFFSET.

| VAR EQN | VAR VAR6 |
G1=(R2+25)/25
R2=10000

| VAR EQN | VAR VAR7 |
DCOFFSETIMIX=2.5
DCOFFSETQMIX=2.7

FIG. 22

QUADRATURE MODULATOR BALANCING SYSTEM

PRIORITY

This application is a non-provisional of U.S. patent provisional application Ser. No. 61/554,807, filed Nov. 2, 2011, the disclosure of which is incorporated by reference herein in its entirety.

BACKGROUND

The present disclosure relates generally to electronic communications systems and, more particularly, to a quadrature modulator balancing system.

Quadrature modulators, IQ mixers, or SSB mixers are a flexible and convenient way to impart modulation onto a carrier. One of the issues with Quad Modulators is the fact that the image and carrier leak-through is a function of how well the I and Q paths of the signal are matched in phase and amplitude.

One existing technique uses a calibration approach to solve this problem. The output of the IQ modulator is monitored on a spectrum analyzer as the various coefficients are altered to get the best performance in terms of image and carrier rejection. An algorithm is used to arrive at the best set of correction factors at every transmit frequency and temperature desired. Other approaches require much more hardware to sample the output of the quad modulator and use various algorithms to arrive at correction factors. The main problem in balancing a quad modulator is determining the phase and amplitude differences between the I and Q paths.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 22 illustrates simulation setup for image cancelling system.

DETAILED DESCRIPTION

All currently known methods for balancing quad modulators involve either a lengthy calibration process or a large amount of ancillary circuitry and a sophisticated software algorithm. The proposed invention uses very little extra circuitry and the algorithm for solving for the correction factors is simple algebra. The new proposed system can measure the imbalances between the I and Q paths and generate appropriate correction factors. This can all be accomplished in a way that is invisible to the end user. The proposed invention solves this by converting the undesired image signal directly to DC, essentially using a mixer as a phase detector. A set of test signals is used to excite the I and Q paths separately. The test signal is a continuous wave (CW) tone at baseband frequency; however the phase is varied from 0 to $2\pi$ radians (or 0 to 360 degrees). The resulting DC signal will also be a cosine function with a phase that is related to the phase errors in each path. The two signals are directly compared and their phase and amplitude differences are determined in order to predistort the modulation to reject the image.

Quadrature modulation is a convenient and flexible way to produce nearly any type of waveform and has been in use for decades. As such, quadrature modulators are ubiquitous in communication systems and the performance of this device is important to the overall system—specifically in terms of carrier and image leakage. The correlation between carrier and image leakage performance and the various RF impairments in a quadrature modulator are well understood. In this paper, novel balancing method is proposed requiring few extra parts and a simple algorithm.

Figure 1:
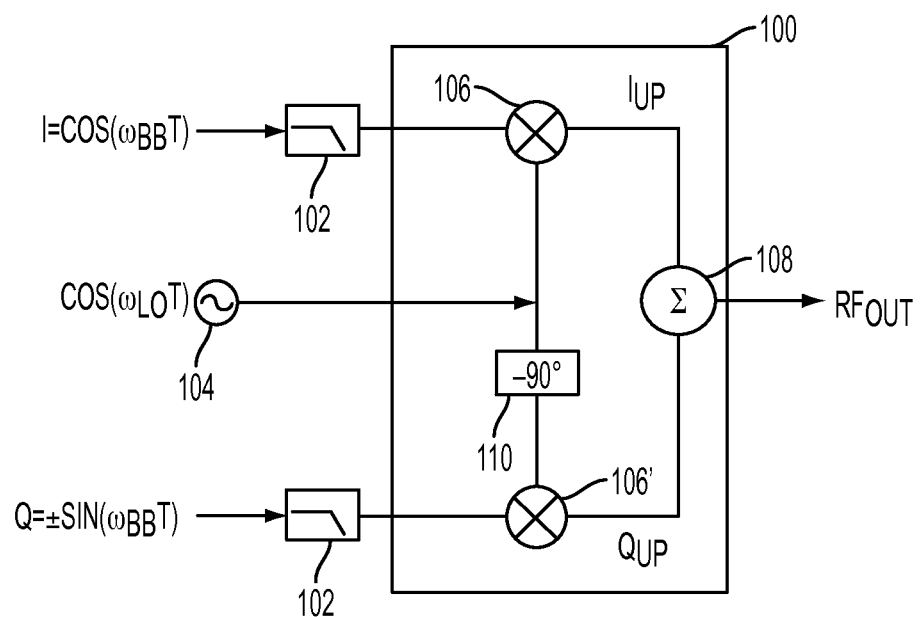
FIG. 1 illustrates an Ideal Quad Modulator.

Considering the case where an ideal quadrature modulator generates a single continuous wave (CW) tone, FIG. 1 shows a typical implementation of a quadrature modulator 100 as the source of a transmitter chain in a communication system. An in-phase (I) signal (e.g., $\cos(\omega_{BB}t)$) and quadrature (Q) signal (e.g., $\pm\sin(\omega_{BB}t)$) may be generated digitally from a combination of a Field-Programmable Gate Array (FPGA) device (not shown) and Digital-to-Analog Converter (DAC)

(not shown). The low-pass filters 102 are included to control aliasing from the digitally generated signals. The quadrature modulator 100 further includes a local oscillator (LO) 104 that generates an LO injection signal (e.g., $\cos(\omega_{LO}t)$), which is input to the quadrature modulator 100. The frequency of the LO injection signal is typically significantly greater the frequencies of the I and Q signals. For example, the I and Q signals may be set at 10 MHz, while the LO injection signal may be set at 500 MHZ. The LO 104 may include a phase-locked loop (PLL) (not shown) or some other tunable CW source. The quadrature modulator 100 further includes first and second mixers 106, 106' that mix the I signal and the Q signal, respectively, with the LO injection signal. A summer 108 sums the mixed I signal ($I_{up}$) and the mixed Q signal ($Q_{up}$) to generate the RF output ($RF_{OUT}$) A 90 degree phase shifter 110 is included in the LO injection signal path to phase shift the LO injection signal of the Q mixer 90 degrees with respect to the LO injection signal of the I mixer. By phase shifting the LO injection by 90 degrees (or −90 degrees) an undesired sideband appearing at $RF_{OUT}$ may be nulled, i.e., cancelled.

For an ideal quad mixer, it may be assumed that no gain or phase change in the I or Q path. Real components, however, do not typically provide an ideal environment. In reality there will be some losses and phase changes in the low pass filters, each mixer and the summing operation at the output. These losses and phase changes will be different for the I and Q paths; which is precisely what degrades the image rejection. There will also be a DC offset present at the I and Q inputs, which may cause LO leakage to the RF output as discussed in greater detail below.

Assuming the ideal case for the sake of derivation, trigonometric identities can be used to derive the $RF_{out}$ signal. With respect to the I-path, there is a mixing operation (i.e., multiplication) to obtain $I_{up}$. Using Trig ID 1 (see Appendix listed in greater detail below), the following equation is obtained:

$$I_{up} = \cos(\omega_{BB}t) \cdot \cos(\omega_{LO}t) = \frac{1}{2}[\cos(\omega_{BB}t + \omega_{LO}t) + \cos(\omega_{BB}t - \omega_{LO}t)]$$

Now in the Q path, the LO undergoes a phase shift of −90°. Accordingly, Trig ID 3 provides the following expression for the LO at the Q mixer:

$$LO_Q = \cos\left(\omega_{LO}t - \frac{\pi}{2}\right) = \sin(\omega_{LO}t)$$

The expression for $Q_{up}$, may be obtained by using Trig ID 2:

$$Q_{up} = \pm\sin(\omega_{BB}t) \cdot \sin(\omega_{LO}t) = \frac{1}{2}[\cos(\omega_{BB}t - \omega_{LO}t) \mp \cos(\omega_{BB}t + \omega_{LO}t)]$$

The final operation is a simple summing of $I_{up}$ and $Q_{up}$.

$$I_{up} + Q_{up} = \frac{1}{2}[\cos(\omega_{BB}t + \omega_{LO}t) + \cos(\omega_{BB}t - \omega_{LO}t)] + \frac{1}{2}[\cos(\omega_{BB}t - \omega_{LO}t) \mp \cos(\omega_{BB}t + \omega_{LO}t)]$$

From the above equation, it can be seen that by changing the sign of the Q input signal, cancelation of either the ($\omega_{BB}t+\omega_{LO}t$) component (upper sideband) or the ($\omega_{BB}t-\omega_{LO}t$) component (lower sideband) may be obtained.

Figure 2:
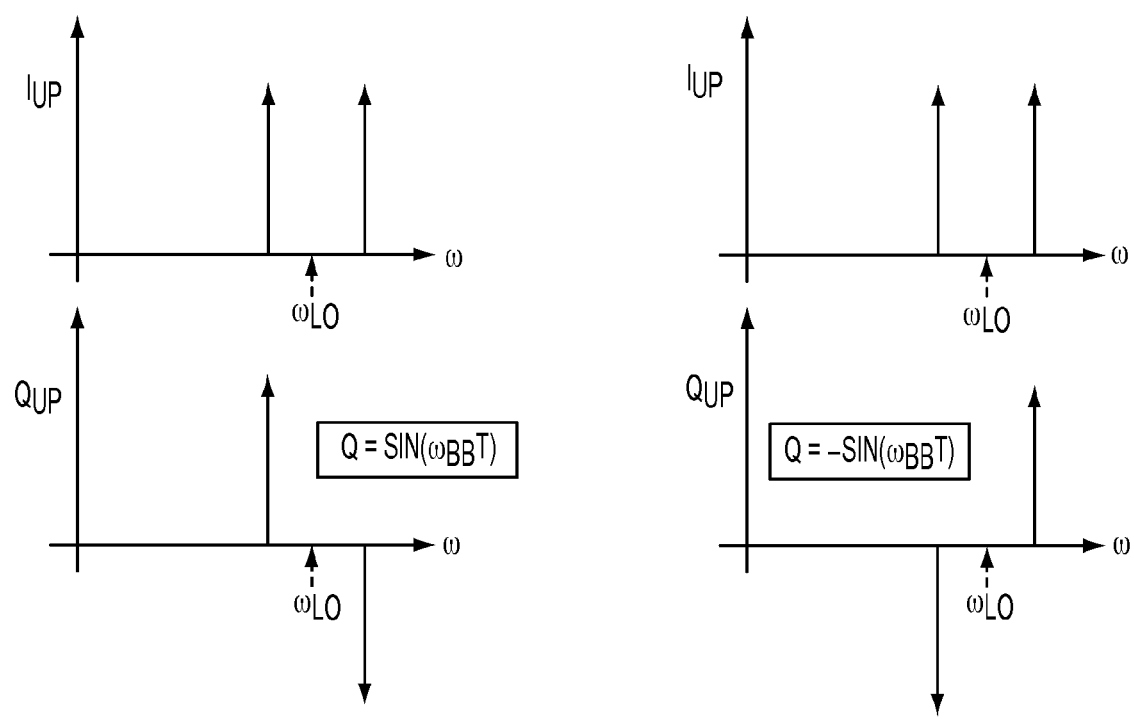
FIG. 2 illustrates $I_{up}$ and $Q_{up}$ components for ±Q.

FIG. 2 illustrates $I_{up}$ and $Q_{up}$ components for ±Q. Considering the case where $Q=\sin(\omega_{BB}t)$, then a one-to-one cancellation (quadrature nulling) of the upper sideband may occur, such that $RF_{,out}$ is expressed as:

$$RF_{out} = \cos(\omega_{BB}t - \omega_{LO}t)$$

Figure 3:
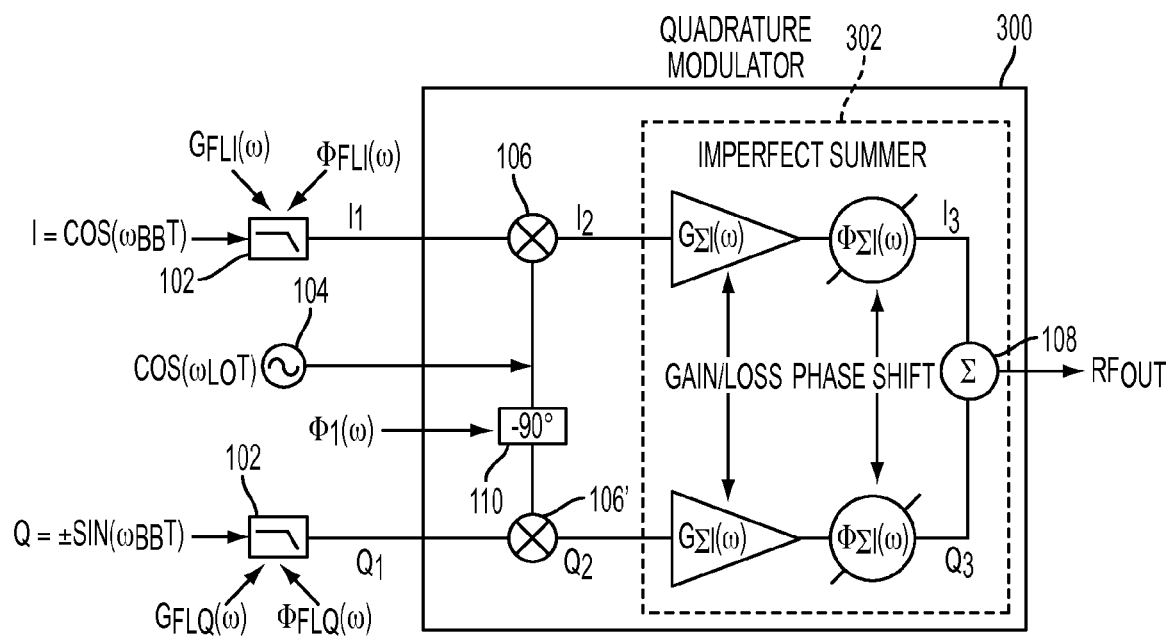
FIG. 3 illustrates a Non-ideal Quad modulator.

Referring now to FIG. 3, a non-ideal quad modulator 300 is illustrated, which shows sources of imperfections inherent in any RF circuitry. For instance, the low-pass anti-aliasing filters 102 have some frequency-dependent loss and phase shift as indicated by $G_{FLI}(\omega)$ and $\phi_{FLI}(\omega)$ respectively. The summing process is also imperfect, so it is represented by an imperfect summer 302. The imperfect summer 302 is illustrated as including various frequency dependent phase and gain response elements.

Figure 4:
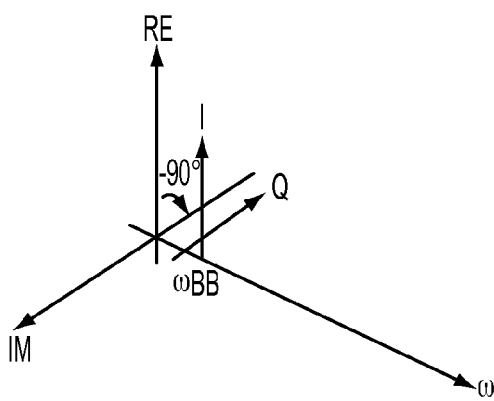
FIG. 4 illustrates I and Q inputs.

For the following derivation, sinusoids will be represented in the figures as vectors with a magnitude and phase. Since these vectors will have different frequencies, a frequency dimension is added to the vector representation. Signals pertaining to the I path will be represented as blue vectors and signals pertaining to the Q path will be represented as red vectors. For instance, the I and Q input signals are shown in FIG. 4.

With respect to the I Path, starting from the I channel input and referring back to FIG. 3, the I input signal undergoes a phase and amplitude shift through the low pass filter. This phase shift is, of course, dependent on the baseband frequency of the sinusoid since the response of the filter is frequency dependent.

$$I_1 = G_{FLI}(\omega_{bb}) \cdot \cos(\omega_{bb}t + \phi_{FLI}(\omega_{bb}))$$

Figure 5:
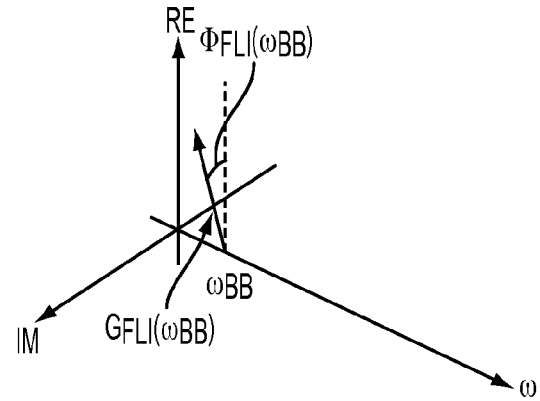
FIG. 5 illustrates $I_1$ Vector Representation.

FIG. 5 illustrates $I_1$ Vector Representation

Now the $I_1$ is mixed with the LO to obtain the up-converted signal $I_2$.

$$I_2 = G_{FLI}(\omega_{bb}) \cdot \cos(\omega_{bb}t + \phi_{FLI}(\omega_{bb})) \cdot \cos(\omega_{LO}t)$$

Using Trig ID 1, the following is obtained:

$$I_2 = G_{FLI}(\omega_{bb}) \cdot \frac{1}{2}(\cos(\omega_{bb}t + \phi_{FLI}(\omega_{bb}) + \omega_{LO}t) + \cos(\omega_{bb}t + \phi_{FLI}(\omega_{bb}) - \omega_{LO}t))$$

Multiply the argument of the second term by −1.

$$I_2 = G_{FLI}(\omega_{bb}) \cdot \frac{1}{2}(\cos(\omega_{bb}t + \phi_{FLI}(\omega_{bb}) + \omega_{LO}t) + \cos(-1(\omega_{LO}t - \omega_{bb}t - \phi_{FLI}(\omega_{bb}))))$$

Accordingly, new frequencies may be expressed as:

$$\omega_L = \omega_{LO} - \omega_{bb} \quad (1)$$

$$\omega_u = \omega_{LO} + \omega_{bb} \quad (2)$$

Using these new frequencies, and the fact that cosine is an even function (Trig ID 4), $i_2$ may be expressed as:

$$I_2 = G_{FLI}(\omega_{bb}) \cdot \frac{1}{2}(\cos(\omega_u t + \phi_{FLI}(\omega_{bb})) + \cos(\omega_L t - \phi_{FLI}(\omega_{bb})))$$

Figure 6:
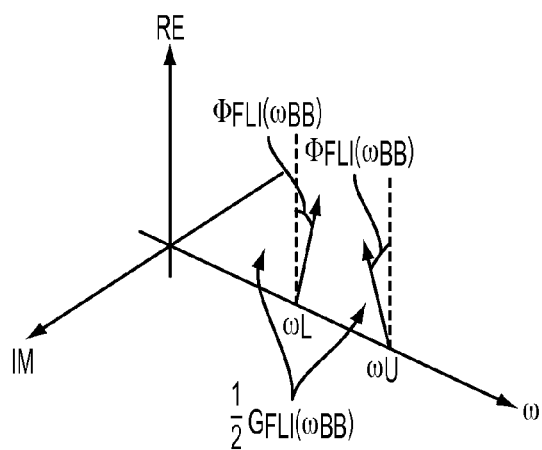
FIG. 6 illustrates $I_2$ Vector Representation.

FIG. 6 illustrates $I_2$ Vector Representation

As described earlier, the summing operation is also imperfect, so it has been represented as a perfect summation with some gain and phase shift added ahead of it. There are two frequency components—each with its own phase shift. Therefore at $I_3$, the following may be obtained:

$$I_3 = G_{FLI}(\omega_{bb}) \cdot \frac{1}{2}[G_{\Sigma I}(\omega_u) \cdot \cos(\omega_u t + \phi_{FLI}(\omega_{bb}) + \phi_{\Sigma I}(\omega_u)) +$$
$$G_{\Sigma I}(\omega_L) \cdot \cos(\omega_L t - \phi_{FLI}(\omega_{bb}) + \phi_{\Sigma I}(\omega_L))]$$

This expression includes a plurality of phase and amplitude terms. Considering each frequency by itself, $I_3$ expression may be simplified by defining the following terms:

$$\phi_{IU} = \phi_{FLI}(\omega_{bb}) + \phi_{\Sigma I}(\omega_u) \text{ and } \phi_{IL} = \phi_{\Sigma I}(\omega_L) - \phi_{FLI}(\omega_{bb})$$

$$G_{IU} = \frac{G_{FLI}(\omega_{bb}) \cdot G_{\Sigma I}(\omega_u)}{2} \text{ and}$$

$$G_{IL} = \frac{G_{FLI}(\omega_{bb}) \cdot G_{\Sigma I}(\omega_L)}{2}$$

Therefore, the I path signal at the input of the perfect summation operator is $$I_3 = G_{IU} \cdot \cos(\omega_u t + \phi_{IU}) + G_{IL} \cdot \cos(\omega_L t + \phi_{IL})$$

Figure 7:
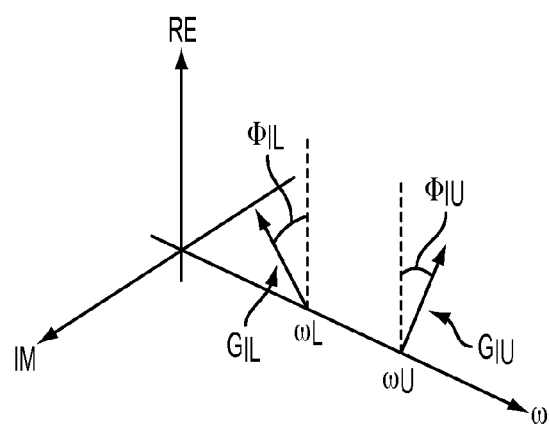
FIG. 7 illustrates $I_3$.

FIG. 7 illustrates $I_3$.

An expression for the effective I channel signal before perfect summation with Q may be expressed. In particular, there are 2 frequency components and each has undergone an unknown amplitude and phase shift.

With respect to the Q Path, derivation of the Q signal may be identical to the I path signal except with a different phase. For the sake of derivation, the case where $Q=\sin(\omega_{BB}t)$ may be considered such that the upper sideband is desired to be nulled, i.e., cancelled. There is no substantial loss in generality because by simply changing the sign of Q, the lower sideband may be instead cancelled. The input Q signal undergoes a phase and amplitude shift through the low pass DAC filter.

$$Q_1 = G_{FLQ}(\omega_{bb}) \cdot \sin(\omega_{bb}t + \phi_{FLQ}(\omega_{bb}))$$

Figure 8:
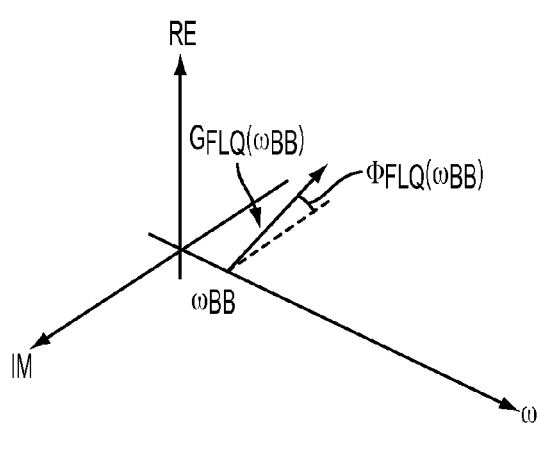
FIG. 8 illustrates $Q_1$.

FIG. 8 illustrates $Q_1$. In the LO path to the Q mixer there is a nominal $-90°$ phase shifter (see FIG. 3). However, this phase shift is imperfect, so an unknown phase error may be added, thereby making it a sine wave at the Q mixer with an added phase term $\phi_1$. This signal may be mixed i.e., multiplied, with $Q_1$ to obtain the following expression:

$$Q_Z = G_{FLQ}(\omega_{bb}) \cdot \sin(\omega_{bb}t + \phi_{FLQ}(\omega_{bb})) \cdot \sin(\omega_{LO}t + \phi_1)$$

Using Trig ID 2, the following is obtained:

$$Q_2 = G_{FLQ}(\omega_{bb}) \cdot \frac{1}{2} \cdot [\cos(\omega_{bb}t + \phi_{FLQ}(\omega_{bb}) - \omega_{LO}t - \phi_1) -$$
$$\cos(\omega_{bb}t + \phi_{FLQ}(\omega_{bb}) + \omega_{LO}t + \phi_1)]$$

Again, the argument of the first term may be multiplied by $-1$ to exploit the characteristic that cosine is an even function (Trig ID 4). Accordingly, the argument may be expressed as:

$$Q_2 = G_{FLQ}(\omega_{bb}) \cdot \frac{1}{2} \cdot [\cos(\omega_{LO}t - \omega_{bb}t - \phi_{FLQ}(\omega_{bb}) + \phi_1) -$$
$$\cos(\omega_{bb}t + \phi_{FLQ}(\omega_{bb}) + \omega_{LO}t + \phi_1)]$$

Referring to (1) and (2), new frequencies may be defined and simplified as:

$$Q_2 =$$
$$G_{FLQ}(\omega_{bb}) \cdot \frac{1}{2} \cdot [\cos(\omega_L - \phi_{FLQ}(\omega_{bb}) + \phi_1) - \cos(\omega_u t + \phi_{FLQ}(\omega_{bb}) + \phi_1)]$$

Figure 9:
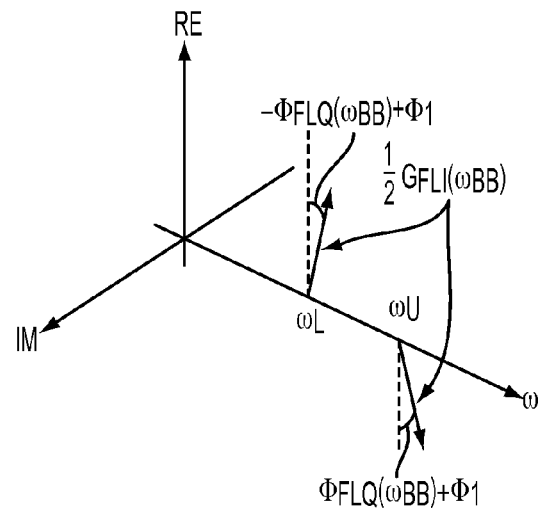
FIG. 9 illustrates $Q_2$.

FIG. 9 illustrates $Q_2$.

Again, the imperfections in the summing operation are accounted for. There are two frequency components—each with its own phase shift. Therefore at $Q_3$, the following is expressed:

$$Q_3 = G_{FLQ}(\omega_{bb}) \cdot \frac{1}{2}[G_{\Sigma Q}(\omega_L) \cdot \cos(\omega_L - \phi_{FLQ}(\omega_{bb}) + \phi_1 + \phi_{\Sigma Q}(\omega_u)) -$$
$$G_{\Sigma Q}(\omega_u) \cdot \cos(\omega_u t + \phi_{FLQ}(\omega_{bb}) + \phi_1 + \phi_{\Sigma Q}(\omega_L))]$$

By considering each frequency component by itself, this expression can be simplified by defining the following:

$$\phi_{QU} = \phi_{FLQ}(\omega_{bb}) + \phi_{\Sigma Q}(\omega_u) + \phi_1 \text{ and } \phi_{QL} = \phi_{\Sigma Q}(\omega_L) - \phi_{FLQ}(\omega_{bb}) + \phi_1$$

$$G_{QU} = \frac{G_{FLQ}(\omega_{bb}) \cdot G_{\Sigma Q}(\omega_u)}{2} \text{ and}$$

$$G_{QL} = \frac{G_{FLQ}(\omega_{bb}) \cdot G_{\Sigma Q}(\omega_L)}{2}$$

Therefore, the Q path signal at the input to the perfect summation operation is $$Q_3 = G_{QU} \cdot \cos(\omega_L t + \phi_{QU}) - G_{QL} \cdot \cos(\omega_U t + \phi_{QL})$$

Figure 10:
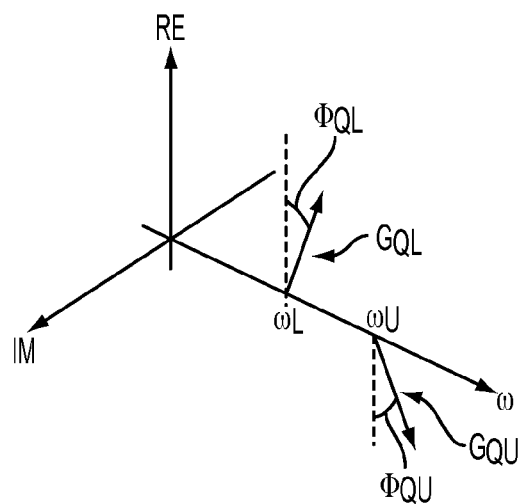
FIG. 10 illustrates $Q_3$.

FIG. 10 illustrates $Q_3$.

Based on the operations above, an expression for the effective Q channel signal before perfect summation with the I component may be determined. There are two frequency components and each has undergone unknown amplitude and phase shifts which are different from the I component and therefore degrade the image rejection performance of the system.

Now adding $I_3$ and $Q_3$ to get $S_1$, the following expression is obtained:

$$I_3 + Q_3 = [G_{IU} \cdot \cos(\omega_U t + \phi_{IU}) + G_{IL} \cos(\omega_L t + \phi_{IL})] +$$
$$[G_{QU} \cdot \cos(\omega_L t + \phi_{QU}) - G_{QL} \cdot \cos(\omega_U t + \phi_{QL})]$$

There are 4 sinusoidal terms, but only 2 frequency components—the upper sideband and the lower sideband. The terms in blue are associated with I, and the terms in red are associated with Q. As the equation is written, the image frequency is the $\omega_U$ term since adding cosines of opposite signs are added. However, suppose the upper product is desired to be the RF signal. To accomplish this, 180° phase shift is added to the Q input, which is the same as multiplying the red terms above by $-1$. But continuing with the derivation, the following expressions are obtained:

$$S_1 = RF + IM$$

$$RF = G_{IL} \cdot \cos(\omega_L t + \phi_{IL}) + G_{QL} \cdot \cos(\omega_L t + \phi_{QL})$$

$$IM = G_{IU} \cdot \cos(\omega_U t + \omega_{IU}) - G_{QU} \cdot \cos(\omega_U t + \omega_{QU})$$

Figure 11:
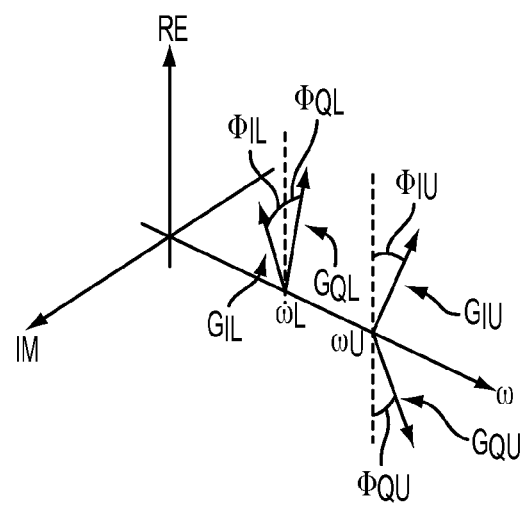
FIG. 11 illustrates $S_1$.
Figure 12:
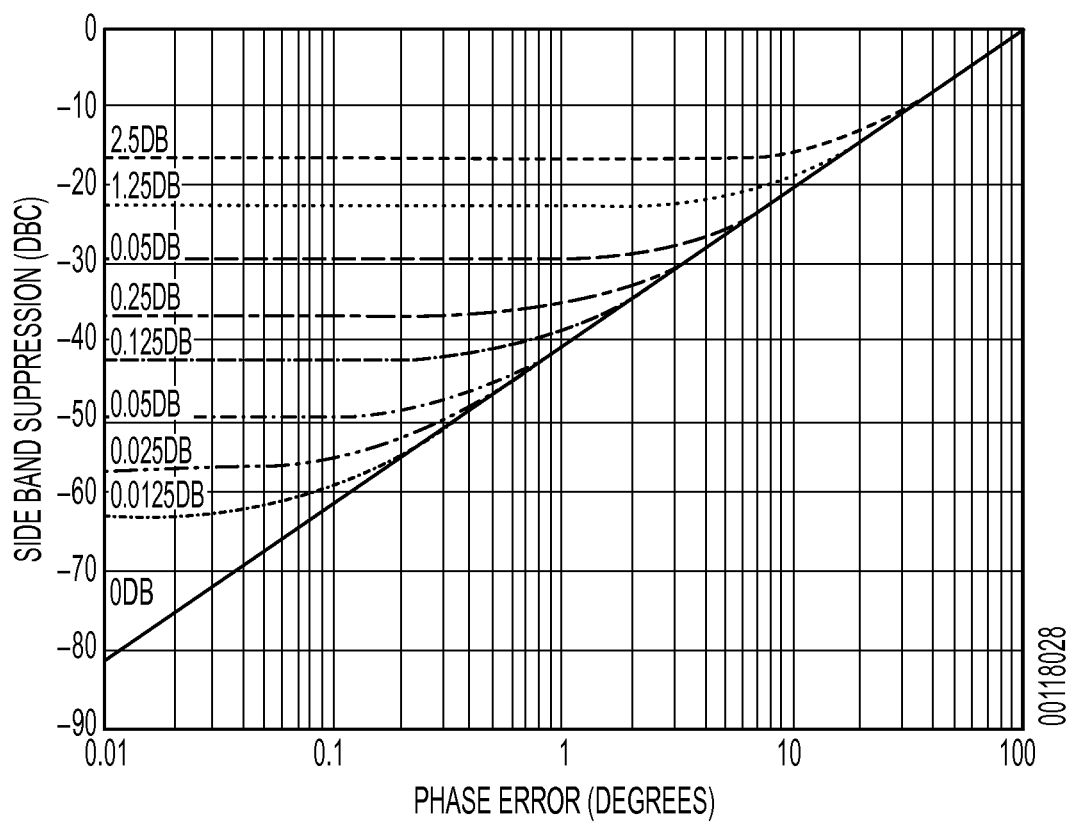
FIG. 12 illustrates electrical characteristics of an exemplary quadrature modulator.

Referring to FIG. 11, the composite signal $S_1$ is illustrated. The composite signal $S_1$ is the output and it contains both the desired RF component and the undesired image. In order to get ideal image rejection from a non-ideal quad modulator the phase and amplitude of the input signals (I and Q) need to be adjusted such that the image vectors at the summed output completely cancel. This requires knowledge of the gain and phase response of the I and Q channels separately. Further, the degree of accuracy of this knowledge is crucial, especially in terms of phase. This is demonstrated in FIG. 12, which is an excerpt from ADL5385 Data Sheet from Analog Devices. More specifically, FIG. 12 illustrates graph illustrating a sideband suppression vs. quadrature phase error for various quadrature amplitude offsets. The graph illustrated in FIG. 12 is typically referred to during each use of a conventional quadrature modulator.

One of the challenges of improving image rejection performance, as FIG. 11 shows, is the fact that the I and Q components are inseparable at the output signal. The following section contains an overview of some of the methods that have been proposed and implemented to improve image rejection performance of quad modulators.

According to at least one embodiment of the disclosure, a system for balancing a quadrature modulator balancing system is configured to cancel an undesired signal, i.e., an image signal, existing at an RF output of a quadrature modulator. More specifically, a sample of the RF output of the quad modulator is mixed with a signal at the image frequency which is phase-locked with the test signal. Accordingly, the image component is converted directly to DC. The I and Q paths are then excited separately with a CW tone whose phase is swept from 0 to $2\pi$ radians (or 0 to 360 degrees). The resulting DC output is a sinusoidal function with respect to the swept phase of the exciting tone which has amplitude and phase related to the changes imposed in each path. The I and Q test signals are then compared to each other to obtain the correction factors.

Figure 13:
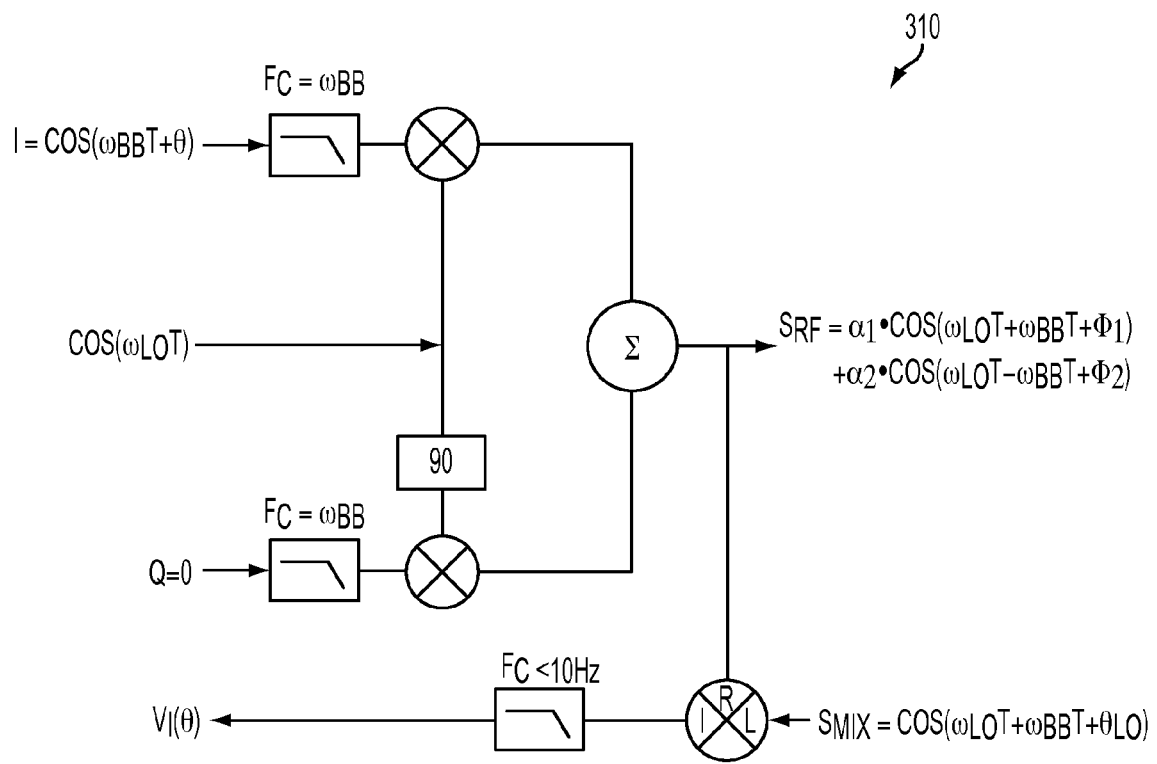
FIG. 13 illustrates a block diagram of a quadrature modulator including signals of I path measurement.

FIG. 13 is a block diagram illustrating an I path measuring system 310 to measure signals corresponding to the I path. The I path measuring system 310 may be integrated in a FPGA, for example. Considering the case where the upper sideband in a quadrature mixer is to be nulled, i.e., cancelled, the upper sideband may be referred to as the image signal and the lower sideband may be referred to as the desired signal. For the first measurement, only the I path is excited. Since there is no Q signal, there is also no quadrature nulling. Therefore both the desired and image signals are present at the output of the quadrature modulator. The output of the system is sampled through some sort of RF coupling and fed into RF port of a mixer. The frequency at the LO port of the mixer is identical to the image frequency, thus mixing the image down to DC. A very low frequency low-pass filter is used at the IF port of the mixer to reject all frequencies except for the DC component, which is now a representation of the image signal that is to be nulled, i.e., cancelled.

Figure 14:
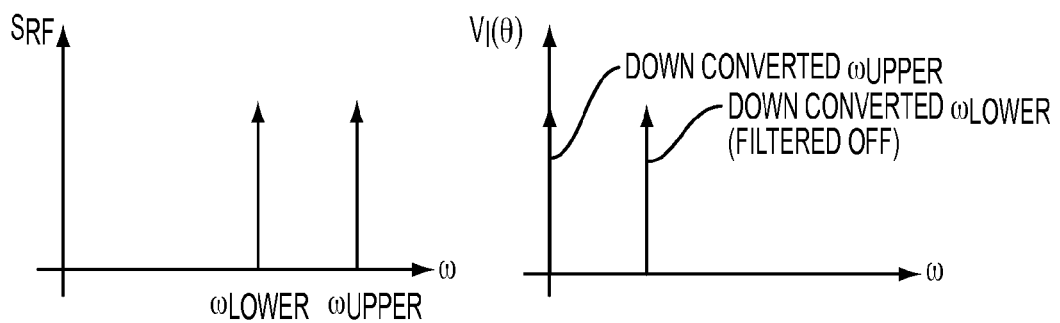
FIG. 14 illustrates $S_{RF}$ and $V_i(\theta)$ from I test signal.

Referring to FIG. 14, $S_{RF}$ and $V_i(\theta)$ resulting from an I test signal is illustrated. When two signals of identical frequencies are applied to a mixer, there is a DC component at the output which has a sinusoidal relationship to the phase difference of the two signals.

Figure 15:
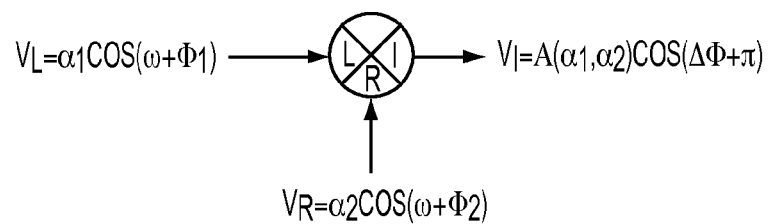
FIG. 15 15 illustrates an ideal mixer as phase detector.
Figure 16:
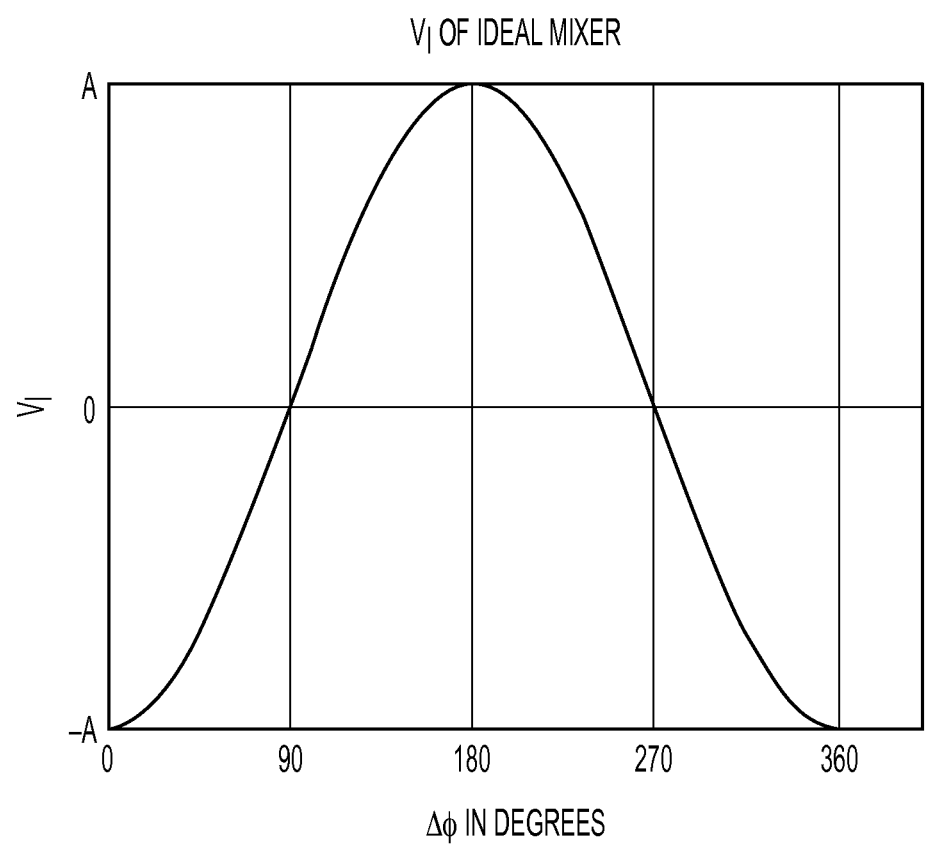
FIG. 16 illustrates $V_1$ of an ideal mixer.

Referring to FIG. 15, an ideal mixer is illustrated as phase detector. For instance, suppose the LO and RF ports of an ideal mixer are derived with sinusoids of identical frequency but different phase. At the IF port of the mixer there will, of course, be both the sum and difference products. In the proposed system, the sum product will be filtered off. Referring to FIG. 16, the $V_1$ of an ideal mixer is illustrated. Accordingly, only the DC component (difference product) is of concern. The resulting DC component may then be realized at the IF port is a function of both the phase and magnitude of the driving signals, as further illustrated in FIG. 16.

In a real mixer, there will be a DC offset component that is unavoidable. There may also be a phase offset which would change the maximum value shown in FIG. 16 to occur at some phase difference other than $\pi$ radians. These offsets discussed and accounted in greater detail below.

Referring back to FIG. 13, it is seen that by incrementally adjusting the phase $\theta$, of the I signal from 0 to $2\pi$ radians (or 0 to 360 degrees) and recording DC output $V_i(\theta)$, of the mixer, the resulting signal is a cosine function with a phase $\phi_I$ that is related to the overall change of phase through the I path of the quadrature modulator and an amplitude $\alpha_I$ related to the magnitude of the I component at the output plus some DC offset and phase offset resulting from the mixer itself.

$$V_i(\theta) = \alpha_I \cos(\theta + \phi_I + \phi_{offset} - \theta_{LO} + \pi) + DC_I$$

Figure 17:
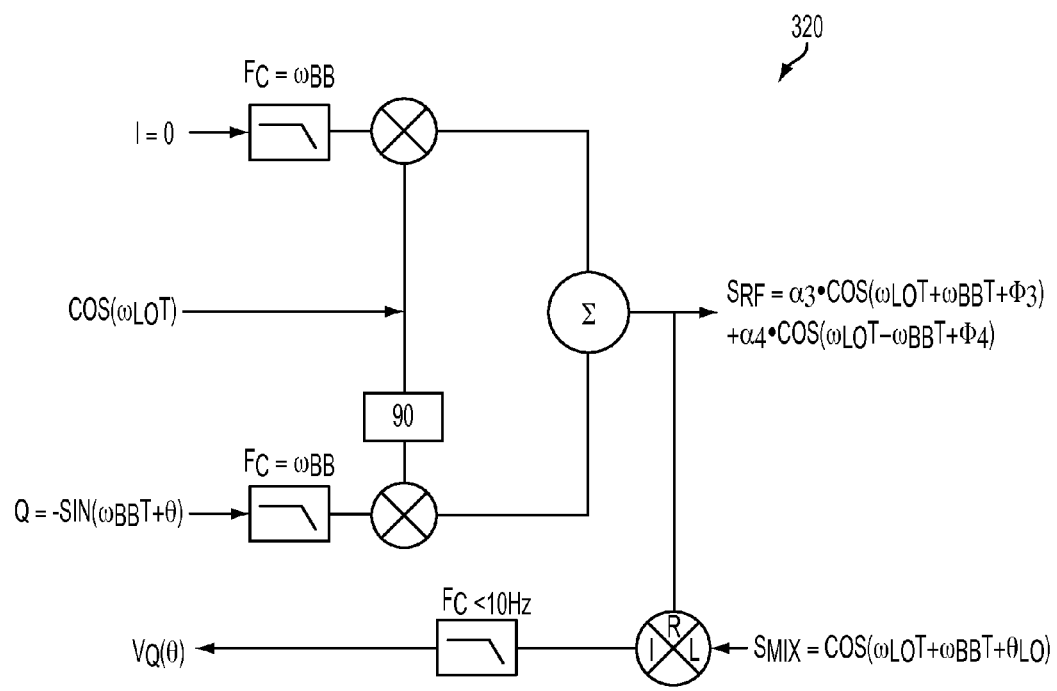
FIG. 17 is a block diagram of a quadrature modulator including signals of Q path measurement.

FIG. 17 is a block diagram illustrating a Q path measuring system 320 to measure signals of Q path. The Q path measuring system 320 may be integrated in an FPGA, for example. In at least one embodiment, the Q path measuring system 320 and the I path measuring system 310 are each integrated in the same FPGA. For the Q path, a process similar to measuring the I path is performed. However, the I path is inactive in this case, and the Q path is excited with a sinusoid in quadrature with the first test signal, as further illustrated in FIG. 17. The recorded set of DC values $V_q(\theta)$ is a sinusoid similar to that of the I path; however it will have a different phase $\phi_Q$ and amplitude $\alpha_Q$ that is related to Q component at the output of the quadrature modulator. There is also a DC offset and phase offset resulting from the mixer, which is discussed in greater detail below. Accordingly, the DC value of $V_q(\theta)$ may be expressed as follows:

$$V_q(\theta) = \alpha_Q \cos(\theta + \phi_Q + \phi_{offset} - \theta_{LO} + \pi) + DC_Q$$

By comparing the magnitudes and phases of $V_i(\theta)$ and $V_q(\theta)$, the amplitude and phase differences between the I-path and Q-path are measured and the appropriate correction factors can be applied to one of the paths. However the mixer induced offsets must first be determined.

The DC offset induced by the mixer is a function of the magnitude of both the LO and the RF signals. Since the same LO is used for both the I and Q signals, the variation in the DC offset will be effected by the signal present at the RF port. Since the test signals are captured digitally, the DC offsets may be removed by subtracting the average from each signal. Accordingly, the following expressions are obtained:

$$V_i(\theta) = \alpha_I \cos(\theta + \phi_I + \phi_{offset} - \theta_{LO} + \pi)$$

$$V_q(\theta) = \alpha_Q \cos(\theta + \phi_Q + \phi_{offset} - \theta_{LO} + \pi)$$

There is also a phase offset induced by the mixer. The effect of this phase offset is that the null at the output of the mixer occurs at some relative phase other than $\pi/2$. This phase shift results from the fact that the electrical lengths from L-port to I-port and from R-port to I-port could be different. Sometimes this is done purposely to match the ports to 50Ω. Since the I and Q test signals are identical in frequency, the phase offsets will also be identical. Since the LO may be phase-locked to the test signals, the following terms may be obtained:

$\Delta\phi_I = \phi_I + \phi_{offset} - \theta_{LO} + \pi$ $\Delta\phi_Q = \phi_Q + \phi_{offset} - \theta_{LO} + \pi$ The phase offset induced by the mixer and the phase of the LO signal can, therefore, be ignored. This leaves two signals, each representative of the I and Q path imperfections. The two signals may be expressed as:

$V_i(\theta) = \alpha_I \cos(\theta + \Delta\phi_I)$ $V_q(\theta) = \alpha_Q \cos(\theta + \Delta\phi_Q)$ In order to properly balance the quadrature modulator, the amplitudes and phases of $V_i$ and $V_q$ must be equal. Only one of the channels, for example the Q path, needs to be predistorted to accomplish this. Accordingly, the following correction factors for the Q path may be obtained:

a gain correction factor: $\alpha_{corr} = \dfrac{\alpha_I}{\alpha_Q}$;  [Equation 1]

and a phase correction factor: $\phi_{corr} = \Delta\phi_I - \Delta_Q$  [Equation 2]

The correction factors are applied to the transmission signal as follows:

correction factor to the I path: $I = \cos(\omega_{BB}t)$; and  [Equation 3.1]

correction factor to the Q path: $Q = \alpha_{corr} \sin(\omega_{BB}t - \phi_{corr})$  [Equation 3.2]

Figure 18:
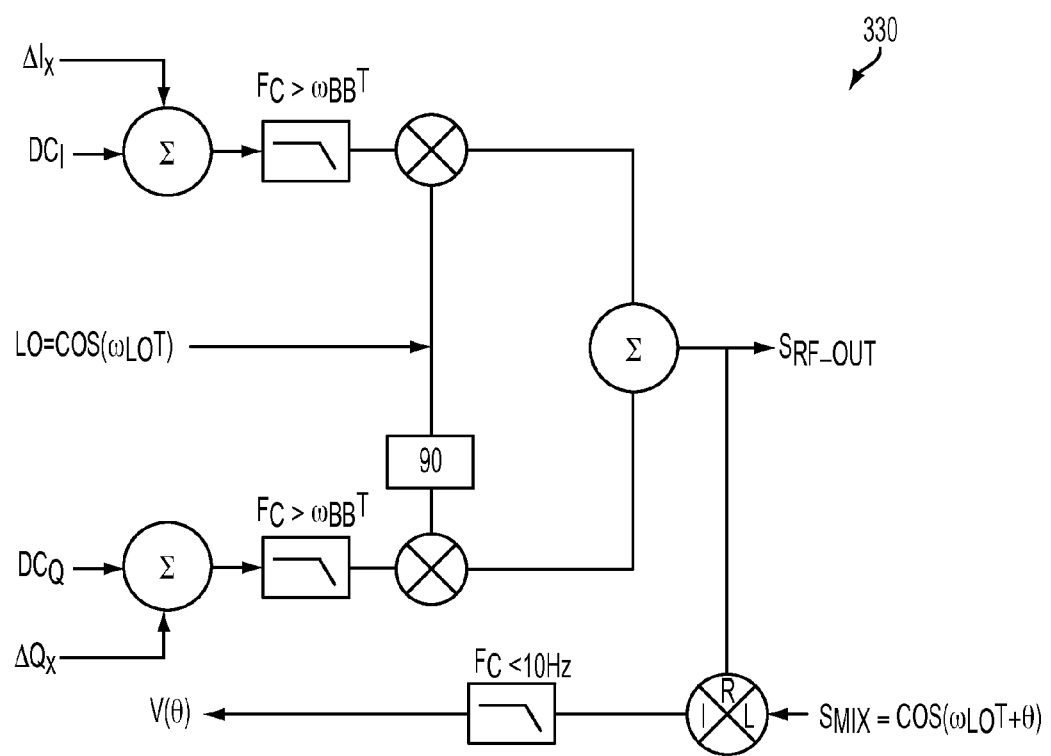
FIG. 18 is a block diagram of a LO cancellation system to down convert an undesired output RF signal to a DC component.

In addition to determining correction factors of the I and Q paths, at least one embodiment of a quadrature modulating balancing system includes LO leakage cancelling system 330 to cancel the LO leakage in a quadrature modulator, as illustrated in FIG. 18. In the LO cancellation system 330, the RF and image components of the composite signal may be disregarded such that only the LO components are considered. As described above, DC offsets may be incorporated into the I and Q signals to cancel the offsets that cause the LO leakage. Accordingly, the DC offset, i.e., DC offset correction value, for each channel, i.e., the I path and the Q path, may be determined.

In at least one embodiment, an undesired signal at the RF output may be down-converted by incrementally adjusting the phase on $S_{mix}$, from 0 to $2\pi$ radians (or 0 to 360 degrees) and monitoring the resulting DC output at $V_{LO}$ to obtain a relative measure of the phase and magnitude of the LO signal. This process of using a mixer as a phase detector is described in detail above. The offsets to be cancelled may be represented by $DC_i$, and $DC_q$. The terms $\Delta I$ and $\Delta Q$ are the offsets which are used to null these terms. Accordingly, one or more correction factors for cancelling the LO leakage may be determined. In at least one embodiment, the LO cancellation system 330 is incororporated in a FPGA, along with the I path measuring system 310 and the Q path measuring system 320.

A leakage cancelling control module may also calculate the correction factors, which may be applied to either the I path or the Q path to cancel the LO leakage based on the following algebraic model:

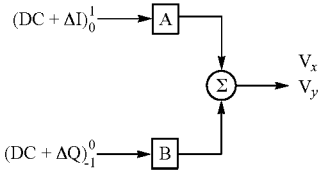

The terms $\Delta I$ and $\Delta Q$ are to be used to nullify the LO. Also, the output of the system is measured, so $V_x$ and $V_y$ are known. The unknown quantities are the matrices [A] and [B] and the scalars DCi and DCq. All of the unknown terms must be resolved in order to find the appropriate DC offsets. This is simplified by the fact that both [A] and [B] may be interpreted as rotational matrices since each of them is the product of two rotational matrices which contain only two unique elements. The model may be expresses as the following matrix:

$$\begin{matrix} Vx \\ Vy \end{matrix} = \begin{bmatrix} a11 & -a12 \\ a12 & a11 \end{bmatrix} \begin{bmatrix} 1 \\ 0 \end{bmatrix}(DCi + \Delta I) + \begin{bmatrix} b11 & -b12 \\ b12 & b11 \end{bmatrix} \begin{bmatrix} 0 \\ -1 \end{bmatrix}(DCq + \Delta Q)$$

All unknown quantities are indicated in bold type above. This expression represents one measurement of the vector V with one ($\Delta I, \Delta Q$) pair of DC offset. This is a system of two equations with six unknowns, so a minimum of three measurements is required to solve for all of the unknowns. If all of the unknown terms are collected in order to separate them from the known terms, then the following two constants are defined as: Kx=a11DCi+b12DCq; and Ky=a12DCi-b11DCq.

Using the newly derived constants, the following expressions for Vx and Vy are determined as: Vx=a11$\Delta I$+b12$\Delta Q$+Kx; and Vy=a12$\Delta I$-b11$\Delta Q$+Ky Given that the unknown quantities are constant, three measurements are needed to set up a system of six equations with six unknowns. This will be accomplished by first arbitrarily choosing starting DC offset corrections ($\Delta I_1$, $\Delta Q_1$) pair and measuring V. For the second measurement of V, only $\Delta I$ is changed and $\Delta Q$ is left constant ($\Delta I_2$, $\Delta Q1$) pair. Finally, the original $\Delta I$ is restored and a new guess is made for $\Delta Q$ ($\Delta I_1$, $\Delta Q_2$) pair for the last of the three measurements of V. Based on the measurements, the unknown rotational matrices are may be defined, and therefore (Kx=Vx-$a_{11}\Delta I$-$b_{12}\Delta Q$) and (Ky=Vy-$a_{12}\Delta I$-$b_{11}\Delta Q$) can now also be solved. That is, the quadrature modulator system is now represented as a set of two equations with two unknowns, (i.e., DCi and DCq), which are the DC offsets. The correction equations to correct the DC offsets may be determined as:

$$DC_i = \frac{b_{12}K_y + b_{11}K_x}{a_{11}b_{11} + a_{12}b_{12}};\text{ and}$$

$$DC_q = \frac{a_{12}K_x - a_{11}K_y}{a_{11}b_{11} + a_{12}b_{12}}$$

Accordingly, the control module may set $\Delta I = -DC_i$; and $\Delta Q = -DC_q$. For example, the control module may receive phase and magnitude information of the undesired LO signal. The control module may then determine V with three different pairs of in-phase and quadrature sinusoidal differentials, i.e., three different ($\Delta I, \Delta Q$) pairs to calculate the correct DC offset, (i.e., $DC_i$, $DC_q$) which nulls the LO leakage. That is, the control module may execute the LO cancellation system 330 three different times, each time utilizing one of the three different (ΔI, ΔQ) pairs. The three different (ΔI, ΔQ) pairs may include, for example, (ΔI$_1$, ΔQ$_1$), (ΔI$_2$, ΔQ$_1$) and (ΔI$_1$, ΔQ$_2$); however, the three different (ΔI, ΔQ) pairs are not limited thereto. The leakage cancelling control module may be integrated in an FPGA.

Simulations were performed in Agilent's Advance Design System (ADS) software in order to validate the proposed system. Due to the complexity of the overall system simulation, it is instructive to take each piece one at a time.

Simulating an Unbalanced Quadrature Modulator

Figure 19A:
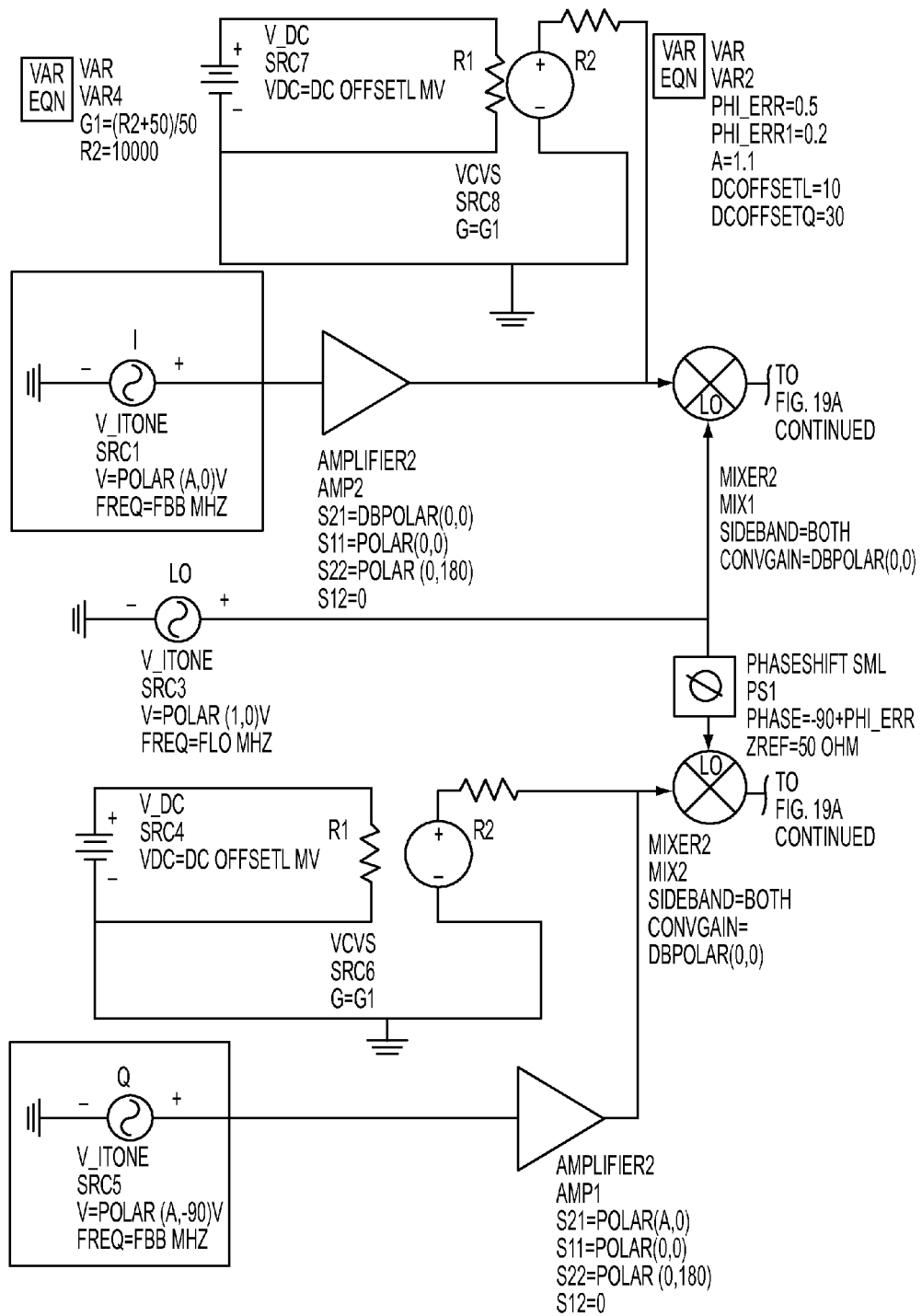
FIG. 19A illustrates an unbalanced quadrature model in ADS.
Figure 19A:
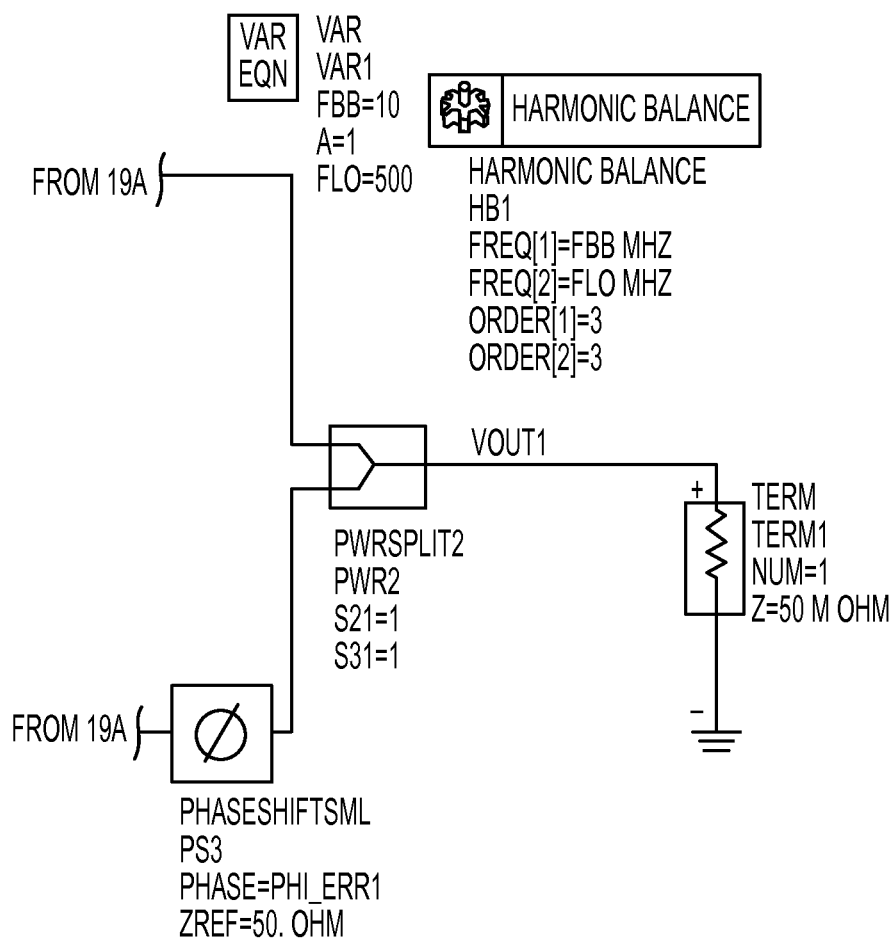

Referring to FIG. 19A, a model of a quadrature modulator including the RF imperfections is illustrated, and a Harmonic Balance simulation was performed using ADS simulation software. Phase and gain imbalances were added to the I and Q channels in order to show degraded image rejection. DC offsets were also added into I and Q which cause the LO leakage. The values of these imbalances are typical for quadrature modulators on the market today (TBD—may need some references).

The input signal for the I channel is a CW tone at 10 MHz with a phase of 0° (cosine) and the Q input signal is a CW tone at the same frequency shifted by −90° (sine). The LO source, i.e., injection signal, has a frequency of 500 MHz with 0° phase. Since the Q signal is a positive sine function, the quadrature modulator is configured to cancel the upper sideband (510 MHz). The desired RF signal is the lower sideband (490 MHz).

For simplicity all imbalances were added to the Q side. Adding imbalances to only one side is valid since the image rejection depends only on the relative imbalance between the two channels. The nominal 90° LO phase shifter for the Q channel has 0.5° of phase error. There is also another 0.2° of phase error added to the Q side before the RF combiner to simulate phase error in the summing circuit. An amplitude imbalance of 1.1 is also added to the Q side as variable A. To simulate the LO leakage, 10 mV of DC offset is added to the I channel and 30 mV of DC offset is added to the Q channel.

Figure 19B:
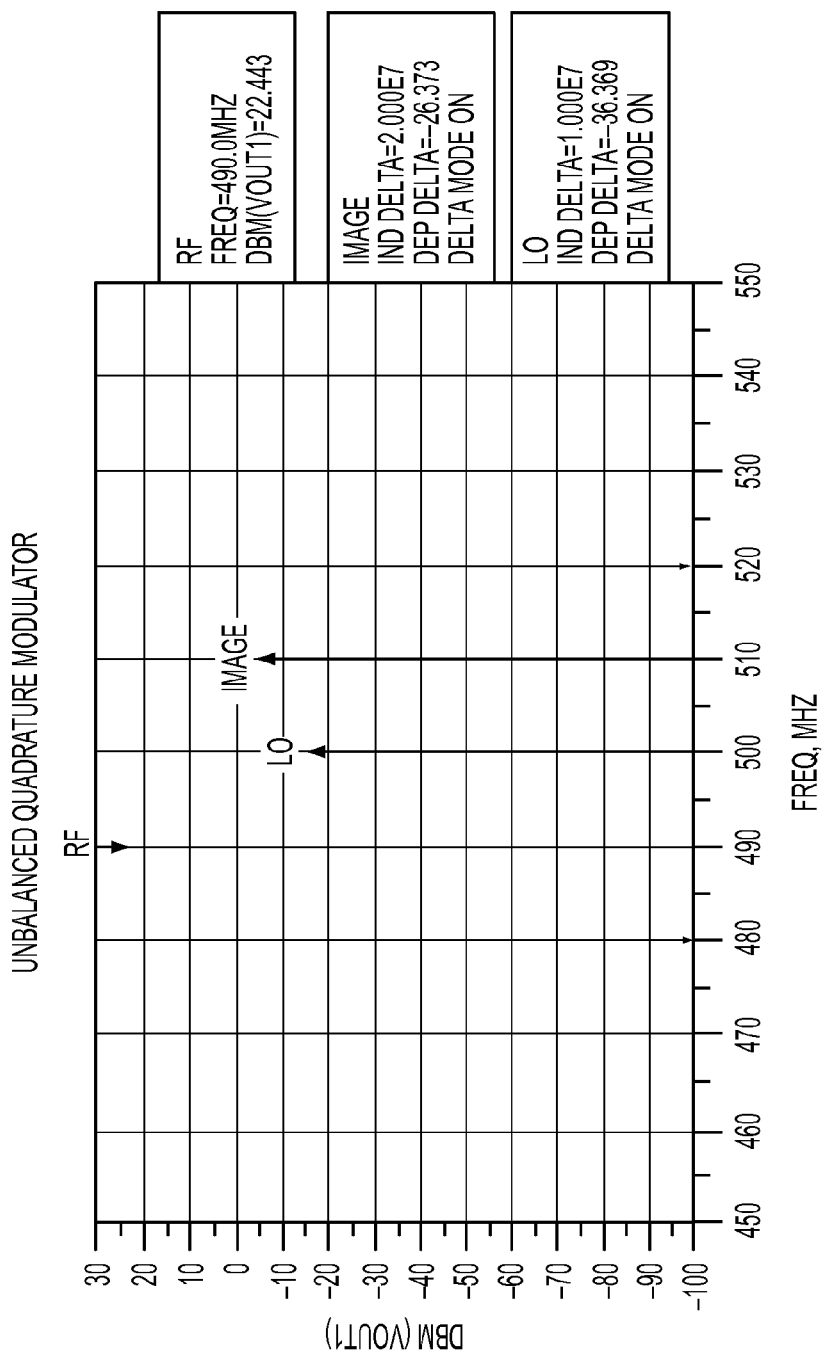
FIG. 19B illustrates unbalanced quadrature modulator simulation results.

As can be seen from the results in FIG. 19B, there is significant LO leakage and image signal present in the output. The imbalances and DC offsets added into this simulation are typical of most commercial quadrature modulators available on the market today.

For this reason, measures are normally taken to improve this performance by pre-distorting the input signals to account for these imbalances and offsets. This can be accomplished by a calibration process where the spectrum is monitored as the phases, amplitudes and DC offsets are manipulated to obtain the best result. This lengthy process is performed at many frequencies and temperatures depending on the application.

FIG. 19B illustrates unbalanced quadrature modulator simulation results simulating a mixer as a phase detector. The ability to null the image may be achieved using a mixer as a phase detector. This process was modeled and simulated in ADS according to the simulation diagram illustrated in FIG. 19A.

Figure 20:
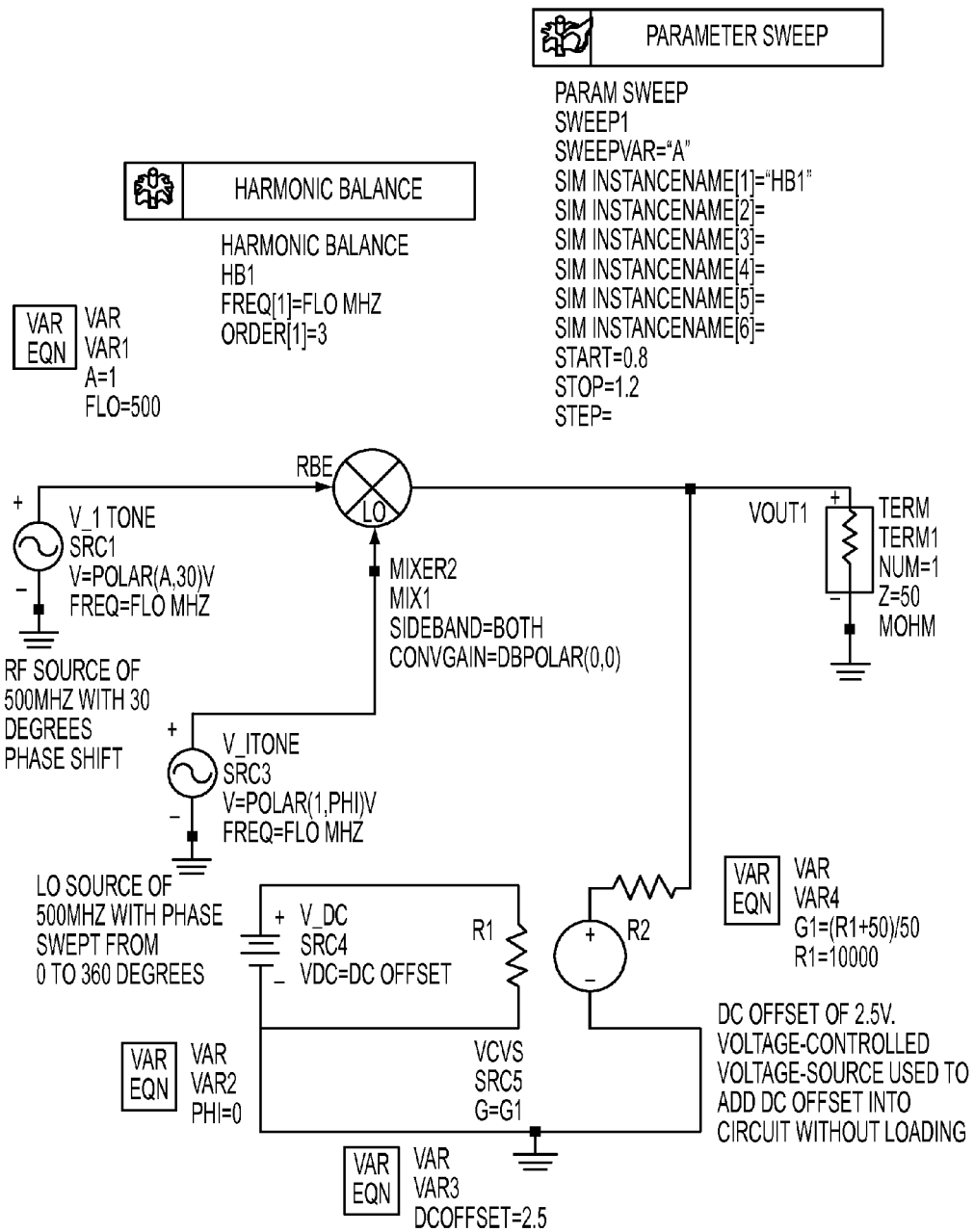
FIG. 20 illustrates ADS simulation of using a mixer as a phase detector.

FIG. 20 illustrates an ADS simulation of using a mixer as a phase detector. Two identical frequencies are applied to the LO and RF ports of a mixer. The signal at the RF port has a phase shift of 30°. The phase of the LO signal is swept from 0° to 360° in 1° increments. The amplitude of the RF signal is also swept from 0.8V to 1.2V in 0.1 V increments. Since the mixer model in ADS does not account for a DC offset, an external DC offset of 2.5V was applied to the output of the mixer through a voltage-controlled-voltage source.

The purpose of this simulation is to demonstrate three concepts. First, by sweeping the phase of one of the input signals, the relative phase of the other input signal can be determined by the phase of the corresponding output signal versus the swept phase. Second, the magnitude of the resulting sinusoid is a function of the magnitude of the RF input signal. And lastly, the DC offset can be determined by simply taking the average value across all phases.

Simulation Results

The harmonic balance simulator produces data for all product frequencies specified by the user in the simulation setup. In our case, there are 2 identical frequencies mixing together to produce DC, twice the frequency, three times the frequency and so on. Since it is assumed that a low pass filter will be used to strip off all components except for DC, the simulation results show only the DC component.

As illustrated in FIG. 19B, the DC output of the mixer is a cosine function with respect to the swept phase variable of the test signal. Each trace corresponds to a separate input power of the test signal. The simulation results show that the output magnitude of the resulting sinusoid is a function of the test signal input power.

Figure 21:
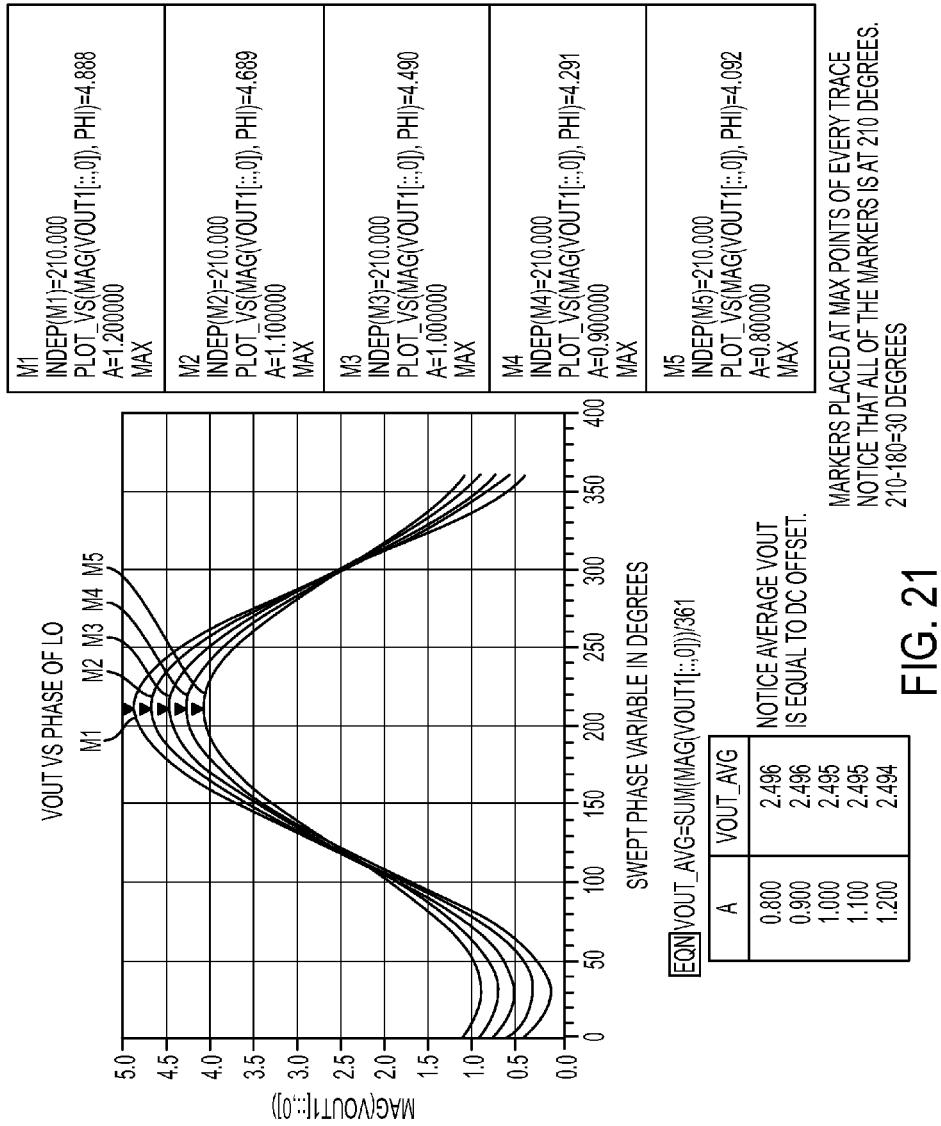
FIG. 21 illustrates mixer as phase detector simulation results.

FIG. 21 illustrates simulation results, where a mixer is utilized as a phase detector. By taking the maximum point on each trace the phase of the output signal is determined. This cosine has a phase of 210°. Further, since the relative phase of the two signals may be determined by subtracting it radians from this cosine function, it may be determined that the input signal has phase 30°.

To prove that the DC offset can be removed, an average of each trace was taken and compared with the DC offset of 2.5V applied in the simulation. In each case, the DC offset was determined to be 2.5V.

Simulating the Image Cancellation System

The simulation for the image cancellation system is a version of the Unbalanced Quadrature Modulator Simulation. There are 2 identical circuits, one of them simulates the I test signal and the other simulates the Q test signal. The imbalances added into both circuits are identical to the Unbalanced Quadrature Modulator Simulation.

Figure 23:
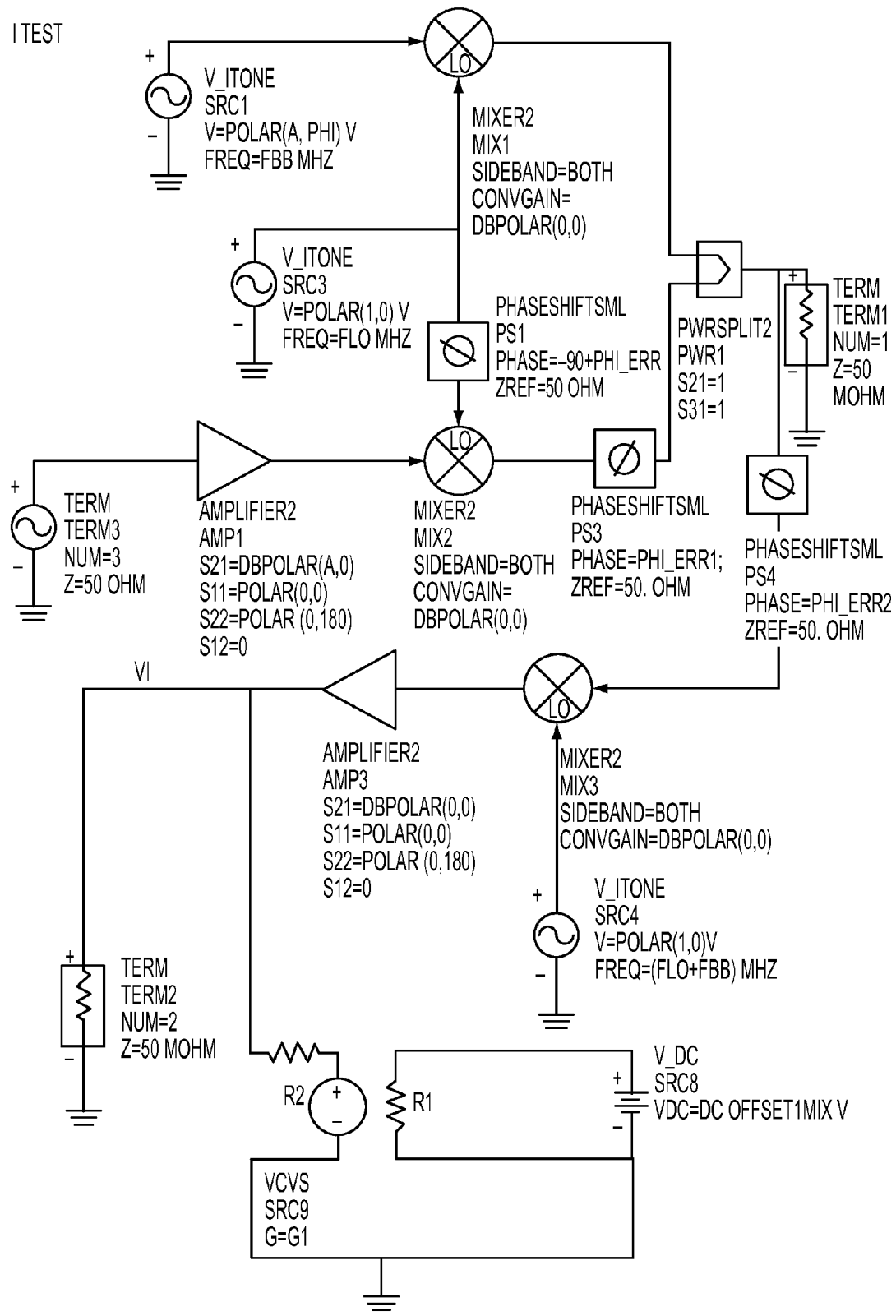
FIG. 23 illustrates image cancellation system—I test signal.
Figure 24:
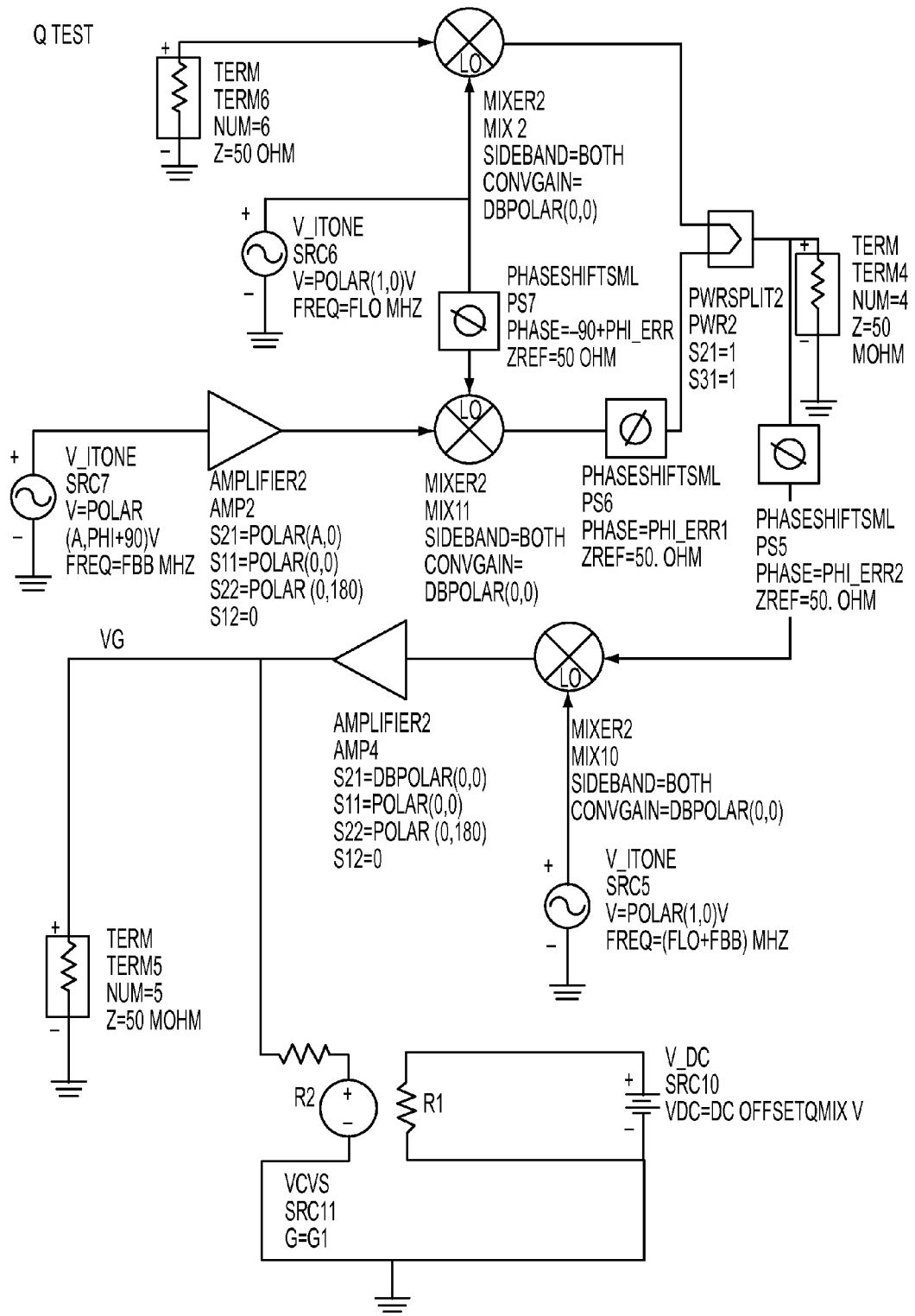
FIG. 24 illustrates image cancellation system—Q test signal.

The simulator sweeps the phases of both input signals from 0° to 360° in 0.1° increments. In both cases the DC output of the mixer is captured in the same manner as described in the above section where the Mixer as a Phase Detector was simulated. Also, different DC offsets were applied to each of the output mixers in order to simulate the DC offset of a real mixer. FIG. 23 illustrates an image cancellation system corresponding to the I test signal, while FIG. 24 illustrates image cancellation system corresponding to the Q test signal.

Simulation Results

The DC output of the mixers were captured as V$_i$ and V$_g$ for the I and Q test simulations respectively. The phase of each test signal was found by simply finding value of the phase variable at the maximum of each trace. The magnitudes of the test signals were found by the following formula.

$$mag_{i,q} = \frac{(\max\{V_{i,q}\} - \min\{V_{i,q}\})}{2}$$

For the first set of data, the DC offset was left in the calculations. Gain and phase correction factors were found by Equation 1 and Equation 2.

Figure 25:
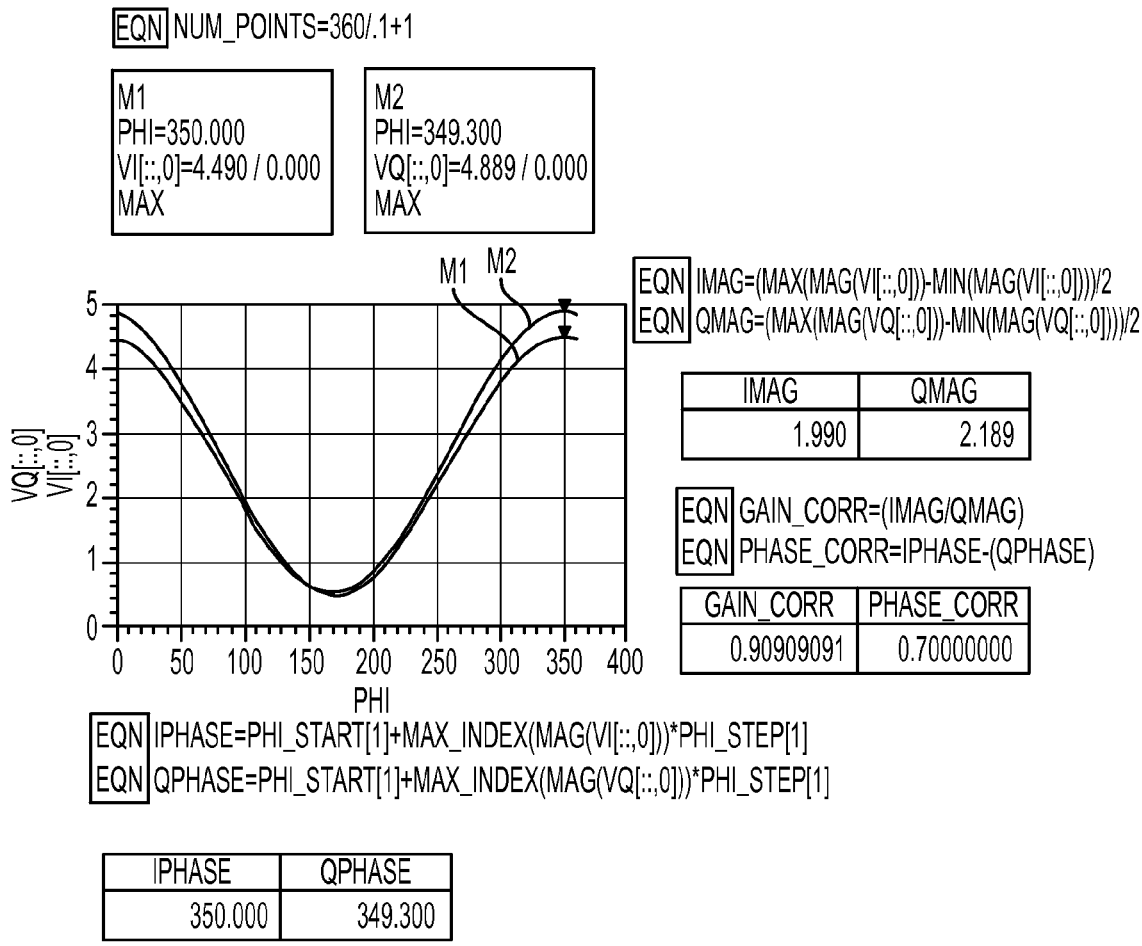
FIG. 25 illustrates quad modulator image cancellation simulation results—DC offset included.

FIG. 25 illustrates Quad Modulator Image Cancellation Simulation Results—DC offset included.

For the second set of data, the DC offset was removed by taking the average value of both traces. All other values were calculated in the exact same manner as above.

Figure 26:
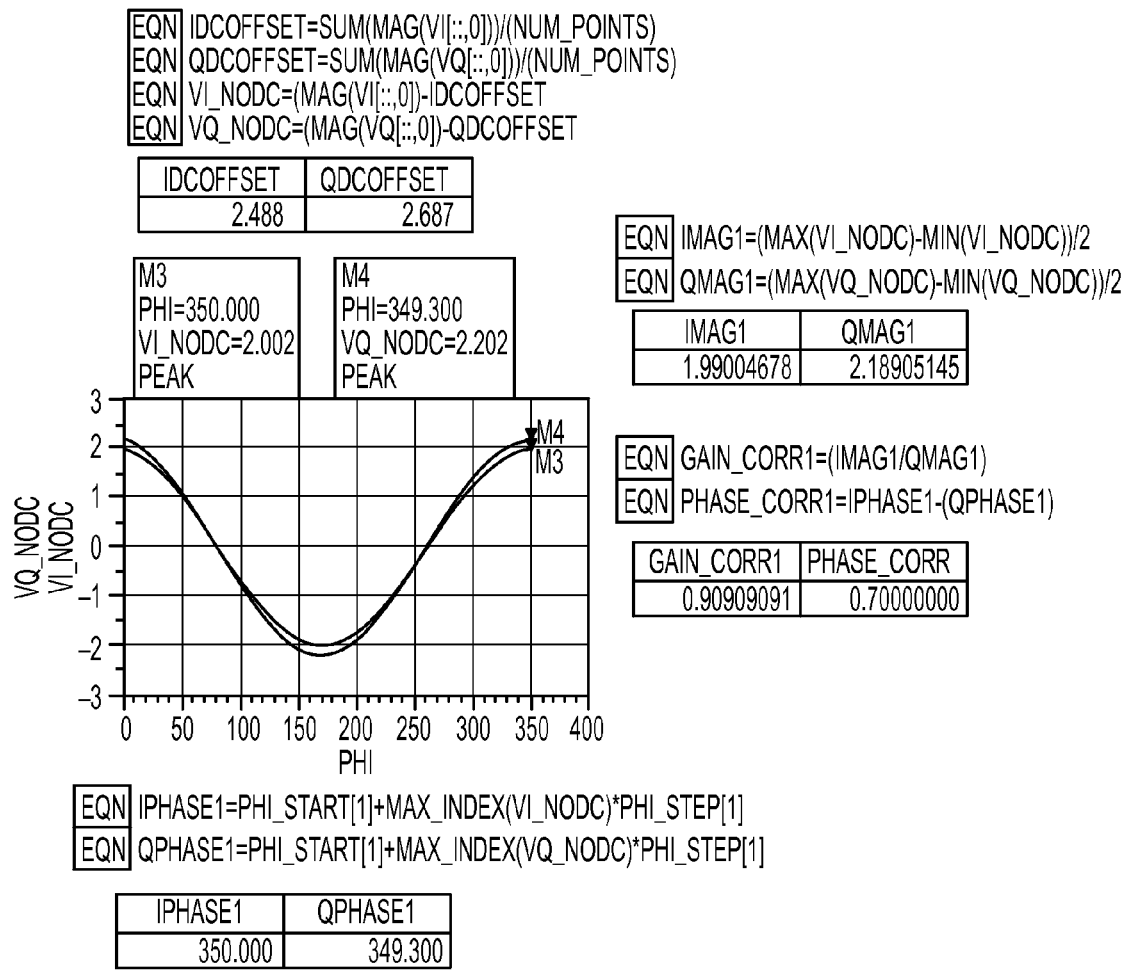
FIG. 26 illustrates quad modulator image cancellation simulation results—DC offset removed.

FIG. 26 illustrates quad modulator image cancellation simulation results—DC offset removed.

In both cases, DC offset included and DC offset removed, identical correction factors were obtained. The obtained values agree with the amount of error added to the simulation, for instance, the correction was 0.7°. This agrees with the 0.5° added to the LO phase shifter plus the 0.2° added to the summing block. The gain correction was calculated to be 0.90909, which is exactly the inverse of the amplitude error of 1.1 that was added.

Figure 27:
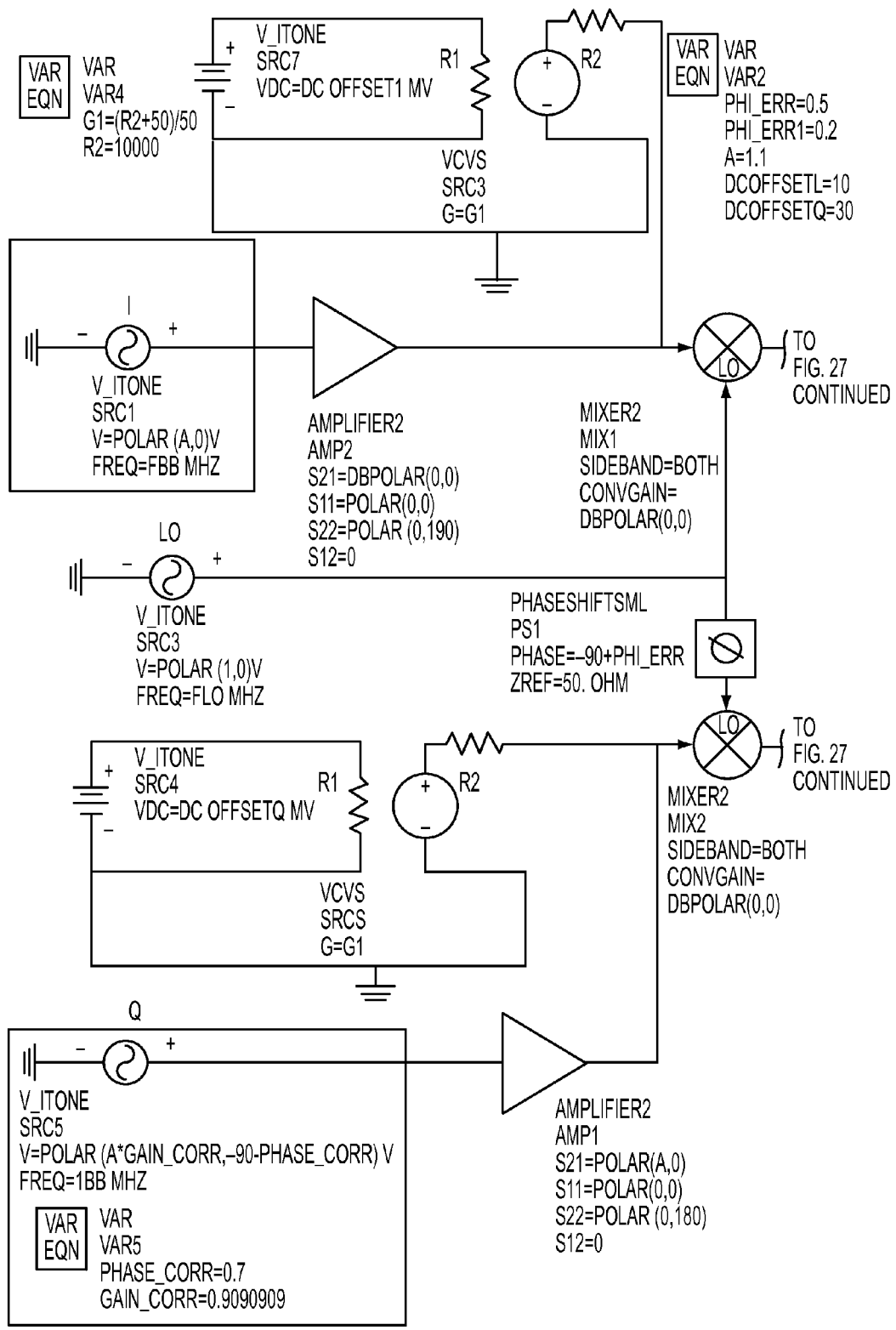
FIG. 27 illustrates unbalanced quad modulator simulation with correction factors for image rejection.
Figure 27:
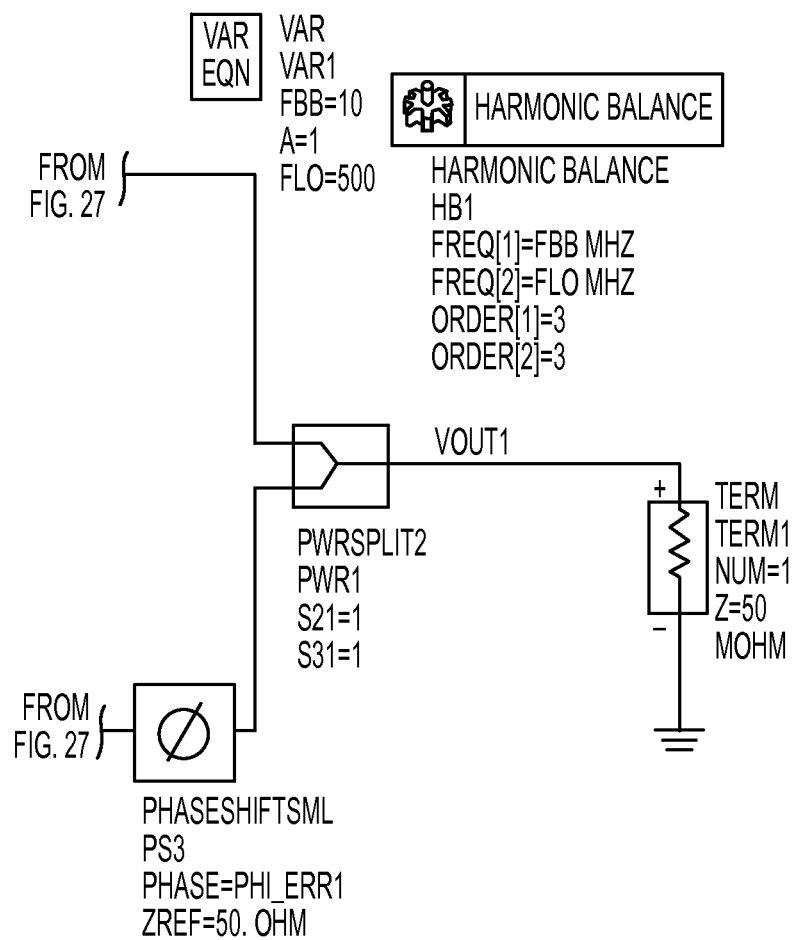

The validity of the system described above may be re-simulated to show the effectiveness of the unbalanced quadrature modulator with the correction factors applied according the embodiments of the disclosure. This simulation was performed and the correction factors were applied, as illustrated in FIG. 27. That is, FIG. 27 illustrates the unbalanced quad modulator simulation with correction factors for image rejection.

Figure 28:
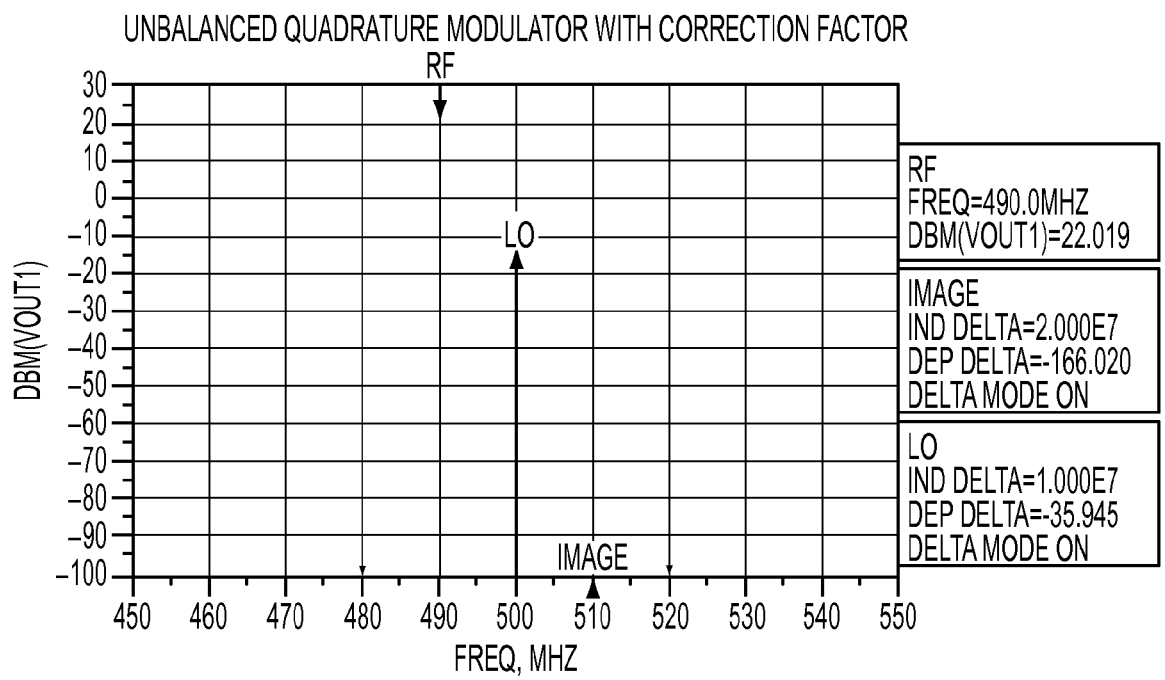
FIG. 28 illustrates simulation results from application of correction factors to unbalanced quad modulator.

FIG. 28 illustrates simulation results from the application of correction factors to an unbalanced quad modulator. By predistorting the Q channel with the appropriate correction factors, the simulation shows an improvement from 26 dB to 166 dB of image rejection.

Figure 29:
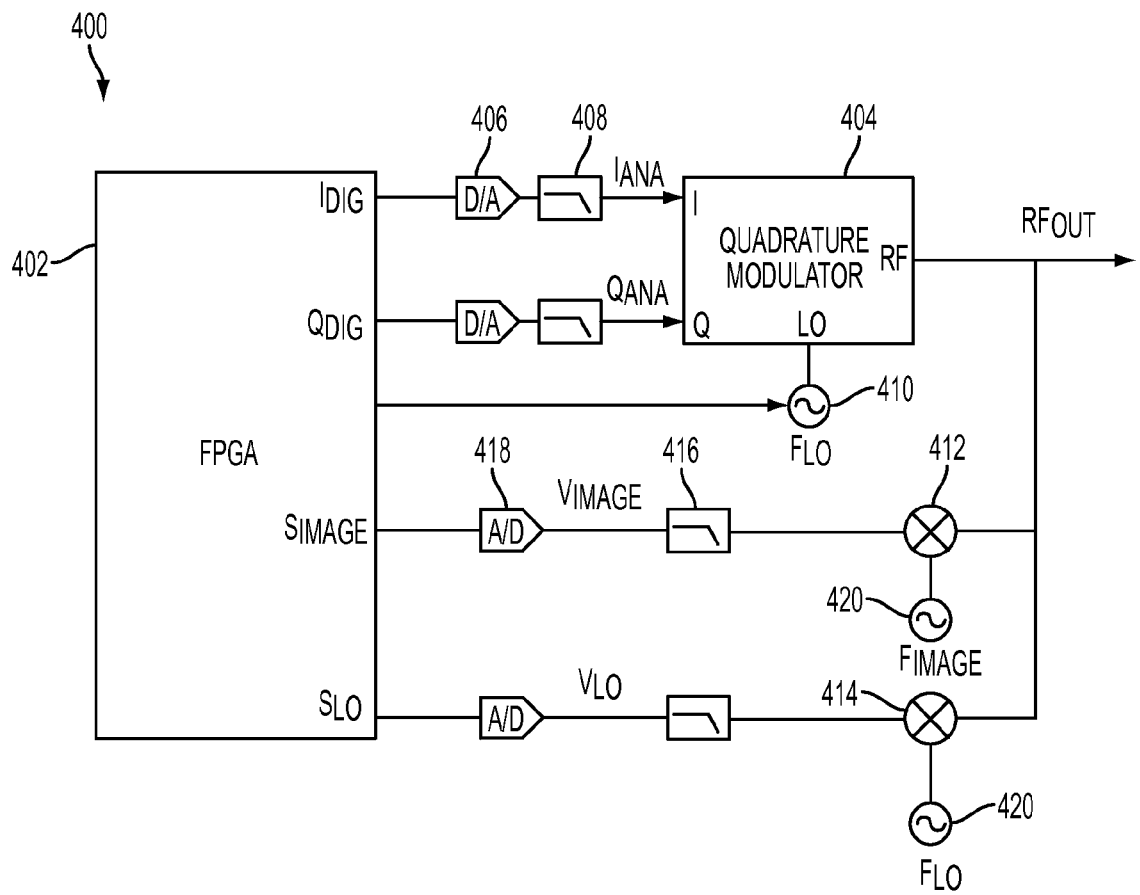
FIG. 29 illustrates an exemplary hardware implementation of a quad modulator balancing system.

An example of an embodiment implementing the quadrature modulation balancing system 400 described in detail above is illustrated in FIG. 29. The quadrature modulation balancing system 400 includes a field programmable gate array (FPGA) 402 and a quadrature modulator 404. The FPGA 402 may be controlled to generate digital I and Q signals having a phase and an amplitude. The generated I and Q signals are then converted to analog signals through the D/A converters 406. The quadrature modulator balancing system 400 may also include low pass filters 408 to mitigate aliasing of the analog I and Q signals that are input to the quadrature modulator 404.

The quadrature modulator balancing system 400 further includes a local oscillator (LO) 410, which generates an LO injection signal having a LO frequency and phase that is input to the quadrature modulator 404. The LO frequency may be phase-locked using, for example, a phase-locked loop with a common reference. Well known broadband PLL ICs are available on the market, which have integrated voltage-controlled oscillators (VCOs) in a single small package with very low power consumption. The injection signal generated by the LO 404 may be set by a user. That is, a user may set a phase, frequency and amplitude of the LO injection signal using the LO 404. The LO 410, which drives the quadrature modulator 404, may define the output phase noise and tune time of the overall quadrature modulator balancing system 400.

The quadrature modulator balancing system 400 may further include an image mixer 412 and a LO mixer 414. The image mixer 412 and the LO mixer 414 each have an input connected to the RF output ($RF_{OUT}$) of the quadrature modulator 404. The image mixer 412 generates a DC component of the image sideband existing at the RF output ($RF_{OUT}$) of the quadrature modulator 404. The image mixer 412, however, is not limited to generating only an image sideband. The LO mixer 414 generates the DC component of the DC offset, which causes the LO leakage. The output of each of the image mixer 412 and the LO mixer 414 are filtered by respective low-pass filters 416. The remaining DC component of the image mixer 412 and the LO mixer 414 are converted to an analog signal by respective analog-to-digital (A/D) converters 418, and are then input to the FPGA 402. Additional signal sources 420 may be connected to the image mixer 412 and the LO mixer 414 to promote down conversion of the image sideband and DC offset to their respective DC components.

The FPGA 402 generates the digital I and Q signals and collects the samples of the LO and image signals. Calculations of the appropriate I and Q correction factors and also the DC offset correction factors may be performed by the FPGA 402 based on outputs from the image mixer 412 and the LO mixer 414, respectively. According to at least one embodiment discussed in detail above, the I and Q correction factors and the DC offset correction factors may be calculated by the FPGA 402 according to algebraic equations such that no lengthy algorithm are required.

Figure 30:
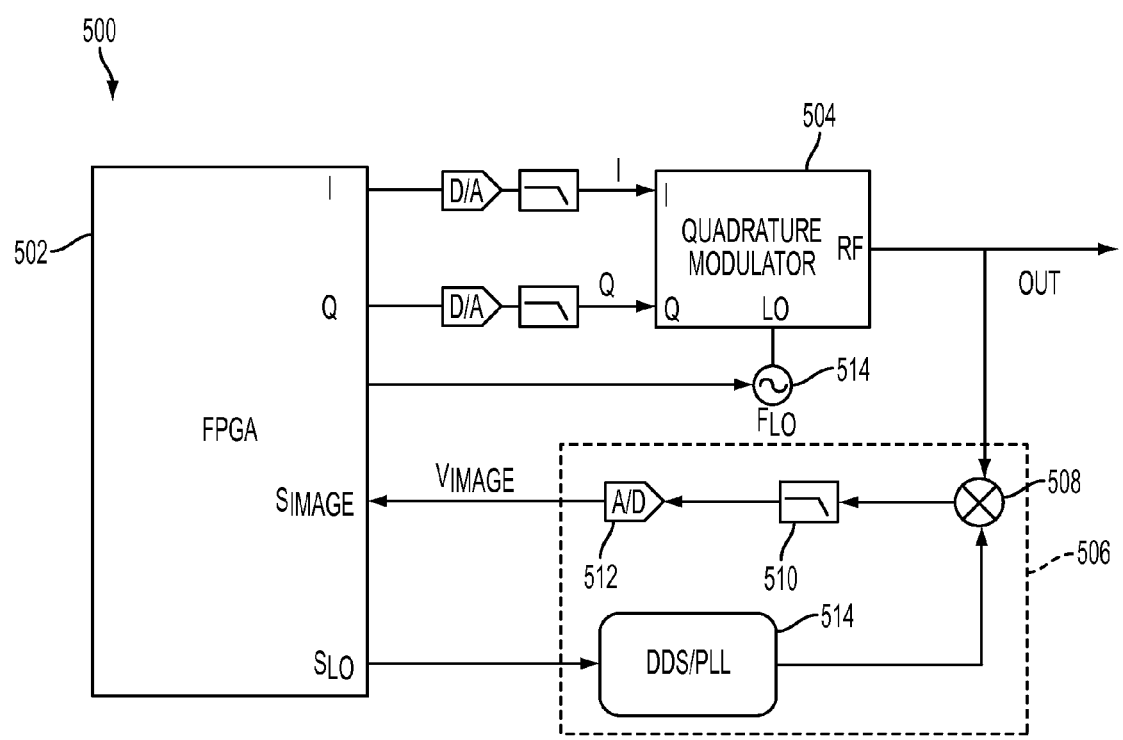
FIG. 30 is a block diagram of a quadrature modulator including a balancing module to reduce output signal degradation according to another embodiment of the disclosure.

Referring now to FIG. 30, a block diagram of a quadrature modulator balancing system 500 according to another embodiment is illustrated. The quadrature modulator balancing system 500 includes an FPGA 502, a quadrature modulator 504 and a balancing module 506 to reduce output signal degradation. The FPGA 502 and the quadrature modulator 504 operate similar to the FPGA 402 and the quadrature modulator 404 illustrated in FIG. 4, which is described above. The balancing module 506 includes an mixer 508, a low pass filter 510, an A/D converter 512, and phase-locked loop (PLL) module 514. The mixer 508 generates a DC component of the image sideband existing at $RF_{OUT}$. The output of the mixer 508 is filtered by the low-pass filter 510. The remaining DC component of the image mixer 508 is converted to an analog signal by the A/D converter 512. The PLL module 514 generates a secondary signal source signal that is phase locked with a clock of the FPGA 502 or the input phase of the LO injection signal generated by a LO 514. The secondary source signal is injected into the mixer to promote down-conversion of the undesired signals at $RF_{OUT}$ for determining the DC components.

Further, the FPGA 502 is in electrical communication with the LO 510. Accordingly, the FPGA may control the phase, frequency and amplitude of the I and Q signals, and may also sweep the phase of each of the I and Q signals. In at least one embodiment, the FPGA 502 may set the parameters of the LO injection signal, for example may control the LO 514 to select a phase, frequency, amplitude, etc., of the LO injection signal. The FPGA 502 may also control the LO 514 to perform a phase sweep of the LO injection signal in a range of 0 to $2\pi$ (or 0 to 360 degrees).<>Based on the phase sweep, the balancing module 506 may determine DC components of the in-phase signal (I) and the quadrature signal (Q). Sinusoidal equivalents of the I and Q may be determined by the FPGA 502, which then compares the sinusoidal equivalent to one another to determine I and Q correction factors. The FPGA 502 applies the correction factors to either the I input or the Q input to balance the quadrature modulator 504.

Figure 31:
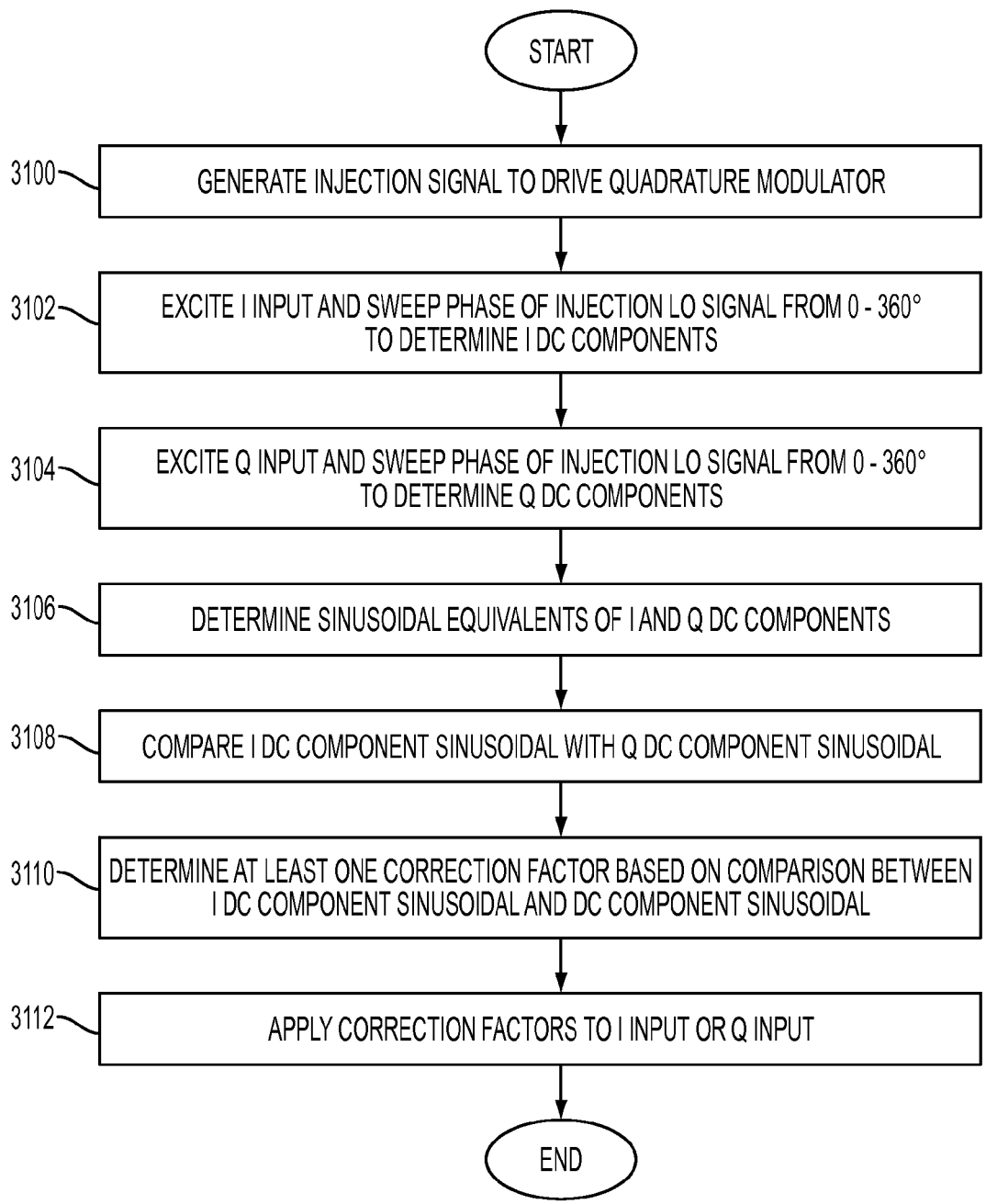
FIG. 31 is flow diagram illustrating a method of balancing a quadrature modulator according an at least one embodiment of the disclosure.

Referring now to FIG. 31, a flow diagram illustrates a method of balancing a quadrature modulator according an at least one embodiment of the disclosure. At operation 3100, an injection signal is generated to drive the quadrature modulator. The injection signal has a input phase, and may be generated by, for example, a local oscillator. At operation 3102, an in-phase (I) input of the quadrature modulator is excited, and a phase sweep of injection signal is performed to determine DC components of the I signal. At operation 3104, a quadrature (Q) input of the quadrature modulator is excited, and a phase sweep of injection signal is performed to determine the Q DC components of the quadrature signal. The phase of the I and Q signals may be swept, for example, from 0 degrees to 360 degrees. At operation 3106, sinusoidal equivalents of the I and Q DC components are determined.

The sinusoidal equivalents of the I and Q DC components are compared to one another at operation 3108. Based on the comparison, one or more correction factors may be determined for cancelling undesired sideband signals existing at the output of the quadrature modulator at operation 3110. At operation 3112, the correction factors are applied to either the I input or the Q input to cancel the undesired output signals and balance the system, and the method ends.

Appendix
Trigonometric Identities and Sinusoidal Multiplication $$\cos(\alpha)\cdot\cos(\beta) = \frac{1}{2}[\cos(\alpha+\beta)+\cos(\alpha-\beta)] \quad \text{Trig ID 1}$$

$$\sin(\alpha)\cdot\sin(\beta) = \frac{1}{2}[\cos(\alpha-\beta)-\cos(\alpha+\beta)] \quad \text{Trig ID 2}$$

Sine-Cosine Phase Relationship $$\mp\sin(\alpha) = \cos\left(\pm\frac{\pi}{2}\right) \quad \text{Trig ID 3}$$

Even and Odd Sinusoids $$\cos(-\theta) = \cos(\theta) \quad \text{Trig ID 4}$$

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A quadrature modulator, comprising:
   a local oscillator that generates an injection signal having an input phase that drives the quadrature modulator;
   an in-phase input that receives an in-phase signal;
   a quadrature input that receives a quadrature signal;
   a DC component module in electrical communication with the local oscillator to perform at least one injection signal sweep that sweeps a phase of the injection signal through a range of degrees, the DC component module configured to determine a plurality of in-phase DC components in response to exciting the in-phase input and to determine a plurality of quadrature DC components in response to exciting the quadrature input,
   wherein the DC component module determines an in-phase sinusoidal equivalent of the plurality of in-phase DC components and determines a quadrature sinusoidal equivalent of the plurality of quadrature DC components.

2. The quadrature module of claim 1, wherein the plurality of in-phase DC components is determined in response to a first injection signal sweep between the range of degrees, and wherein the plurality of quadrature DC components is determined in response to a second injection sweep between the range of degrees.

3. The quadrature modulator of claim 1, further comprising a balancing module in electrical communication with the DC component module to determine at least one correction factor that balances the quadrature modulator based on a comparison between the in-phase sinusoidal equivalent and the quadrature sinusoidal equivalent.

4. The quadrature modulator of claim 3, wherein the balancing module further comprises a PLL module that determines the input phase of the injection signal and inputs a secondary source signal having the input phase to the DC component module, the DC component module configured to determine the plurality of in-phase and quadrature DC components based on the secondary source signal.

5. The quadrature modulator of claim 4, wherein the balancing module outputs the at least one correction factor to one of the in-phase input or the quadrature input to null an undesired signal existing at an output of the quadrature modulator.

6. The quadrature modulator of claim 5, wherein each in-phase DC component and each quadrature DC component corresponds to a degree swept during the injection signal sweep.

7. The quadrature modulator of claim 6, further comprising a leakage cancelling module in electrical communication with the DC component module that determines at least one DC offset correction factor, and introduces the DC offset correction factor to at least one of the in-phase input and the quadrature input.

8. The quadrature modulator of claim 7, wherein the DC offset correction factor is based on three different pairs of in-phase and quadrature sinusoidal differentials.

9. The quadrature modulator of claim 8, further comprising a field programmable gate array (FPGA) that outputs the in-phase signal to the in-phase input and the quadrature signal to the quadrature input.

10. The quadrature modulator of claim 9, wherein the FPGA excites the in-phase input and the quadrature input mutual exclusively from one another.

11. The quadrature modulator of claim 2, wherein the range of degrees comprises 0 degrees to 360 degrees.

12. A method of balancing a quadrature modulator, the method comprising:
   exciting an in-phase input of the quadrature module and sweeping a phase of an injection signal through a range of degrees;
   determining a plurality of in-phase DC components, each in-phase DC component corresponding to a degree swept during the sweeping;
   exciting a quadrature input of the quadrature module and sweeping a phase of the injection signal through the range of degrees;
   determining a plurality of quadrature DC components, each quadrature DC component corresponding to a degree swept during the sweeping;
   determining an in-phase sinusoidal equivalent of the plurality of in-phase DC components and determining a quadrature sinusoidal equivalent of the plurality of quadrature DC components; and
   determining at least one correction factor that balances the quadrature modulator based on a comparison between the in-phase sinusoidal equivalent and the quadrature sinusoidal equivalent.

13. The method of claim 12, further comprising introducing the at least one correction factor to one of the in-phase input or the quadrature input to null an undesired signal existing at an output of the quadrature modulator.

14. The method of claim 13, further comprising determining the plurality of in-phase and quadrature DC components based on a secondary source signal having a phase that is locked to an input phase of the injection signal.

15. The method of claim 14, wherein the range of degrees comprises 0 degrees to 360 degrees.

16. The method of claim 15, further comprising determining at least one DC offset correction factor, and introducing the DC offset correction factor to at least one of the in-phase input and the quadrature input.

17. The method of claim 16, further comprising determining the DC offset correction factor based on three different pairs of in-phase and quadrature sinusoidal differentials.

18. The method of claim 17, further comprising exciting the in-phase input mutual exclusively from the quadrature input.

* * * * *